United States Patent
Enomoto et al.

(10) Patent No.: US 6,367,080 B1
(45) Date of Patent: Apr. 2, 2002

(54) INTERNET INFORMATION DISPLAYING APPARATUS

(75) Inventors: Mitsunobu Enomoto, Nara; Nobuo Kuchiki, Nishinomiya; Yuji Hase, Shijyonawate, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 08/905,218

(22) Filed: Aug. 1, 1997

(30) Foreign Application Priority Data

| Aug. 2, 1996 | (JP) | 8-205103 |
| Aug. 2, 1996 | (JP) | 8-205104 |
| Aug. 5, 1996 | (JP) | 8-206222 |
| Aug. 5, 1996 | (JP) | 8-206224 |
| Oct. 22, 1996 | (JP) | 8-279582 |
| Oct. 22, 1996 | (JP) | 8-279583 |

(51) Int. Cl.$^7$ .......................... H04N 7/10; H04N 5/262; H04N 7/173
(52) U.S. Cl. ............... 725/112; 725/139; 348/564; 348/565; 348/588
(58) Field of Search ................ 348/564, 568, 348/565, 566, 567, 588; 725/111–113, 133–138

(56) References Cited

U.S. PATENT DOCUMENTS

| 4,954,882 A | | 9/1990 | Kamemoto |
| 4,995,738 A | * | 2/1991 | Shibaoka ................. 400/7 |
| 5,167,017 A | * | 11/1992 | Sasaki .................. 707/531 |
| 5,363,143 A | * | 11/1994 | Duffield ................ 348/564 |
| 5,818,441 A | * | 10/1998 | Throckmorton et al. .... 345/328 |
| 5,875,000 A | * | 2/1999 | Yamaguchi ............. 348/563 |
| 5,929,849 A | * | 7/1999 | Kikinis ................ 345/327 |

FOREIGN PATENT DOCUMENTS

| DE | 40 31 213 C1 | 1/1992 |
| EP | 0 661 872 A2 | 7/1995 |
| EP | 0 716 543 A2 | 6/1996 |
| WO | WO 91/19395 | 12/1991 |
| WO | WO 97/31476 | 8/1997 |

OTHER PUBLICATIONS (Press Release; Web TV and its Consumer Electronics Licensees Debut First Internet TV Network and Set–Top Box; 1–5), Jul. 1996.*

PC Magazine On–Line, The Big–Tube PCTV, May 1996.*

European Communication Office Action, dated Oct. 20, 2000, 6 Pages.

"Multimedia–Terminal als Endgerät", Bach et al, *Funk-schau*, vol. 68, No. 6, Mar. 1, 1996, pp. 70–75.

(List continued on next page.)

*Primary Examiner*—Andrew Faile
*Assistant Examiner*—Reuben M. Brown
(74) *Attorney, Agent, or Firm*—Arent Fox Kintner Plotkin & Kahn PLLC

(57) ABSTRACT

An Internet information displaying apparatus, comprising: a video intermediate frequency detector (11) for extracting a first picture signal from a video signal and outputting it; a gate array (36) for converting the digital data taken in from the Internet into a second picture signal, and for compressing the second picture signal in the horizontal direction of the screen of a CRT (17); a TV picture horizontal compression unit (18) for compressing the first picture signal in the horizontal direction of the screen of the CRT (17); the gate array (36) for compressing the second picture signal in the horizontal direction of the screen of the CRT (17); a picture right and left composing unit (19) for composing the picture signals compressed by the unit (18) and the gate array (36), respectively, in a row; and switching units (14, 23) for switching the picture signal to be displayed on the screen of the CRT (17) into any of the first picture signal, the second picture signal, and the picture signal composed by the picture right and left composing unit (19). Television program and the Internet screen are displayed simultaneously.

2 Claims, 33 Drawing Sheets

OTHER PUBLICATIONS

"Endgeräte für Interaktive Video–und Multimedia–dienste", Kays, *Radio Fernsehen Elektronik*, vol. 45, No. 2, Feb. 1996, pp. 53–56.

"Internet Handbook for Corporate Users", *Nikkei Communications*, Nov. 30, 1994, pp. 164–172.

U. Tietze, Ch. Schenk: 'Halbleiter–Schaltungstechnik', 1986, Springer–Verlag, Berlin, pp. 672–675.

* cited by examiner

INTERNET INFORMATION DISPLAYING APPARATUS

BACKGROUND OF THE INVENTION

The present invention relates to an Internet information displaying apparatus taking in the information, converting into picture signals, and displaying on a CRT display or the like.

Recently, owing to the wide popularity of personal computers, information is transmitted and received widely by using the Internet.

The Internet is a network of multiple computers connected on a global scale, and various pieces of readable information are stored in individual computers. These pieces of information include E-mails, various programs, and home pages, which can be communicated in two ways. The home page corresponds to the title and table of contents of a piece of information, and by selecting a graphic pattern (icon) or a word on the home page, the necessary information can be reviewed.

Therefore, recently, more an more users are using the Internet as the site of information presentation. It is the WWW (World Wide Web) that is noticed as the server for providing such information.

The reason why the WWW server is drawing attention is mainly due to the wide spread of the client software (browser) for retrieving information by using a graphical menu. By the development of such browser, it becomes easier to search information on the network, and the traffic volume to the WWW server increased rapidly, and the users have come to notice as the publicity media, and many users have come to use.

To read information of the WWW server, as mentioned above, the browser is needed. For example, the browser is disclosed in pages 164 to 167 of "Internet Handbook for Corporate Users", an extra output of Nikkei Communications published by Nikkei BP (Nov. 30, 1994).

On the other hand, to review the information of WWW server by the Internet, conventionally, it was necessary to install the browser in the personal computer.

FIG. 1 is a schematic diagram showing a conventional connection example of computer and Internet. In this connection example, a personal computer 7 is connected to a communication line 2 through a modem 8 or a terminal adapter, and through the communication line 2, it is further connected to a modem 3 or a terminal adapter of a provider which is a connection service firm. The modem 3 is connected to a server 4 which is the computer of the provider.

The server 4 is connected to the Internet 6 around the clock, and is connected to the Internet 6 through a router 5 for setting a trunk route.

From the personal computer 7, a telephone call is made when necessary, and a connection is made to the Internet 6 through the server 4 of the provider (dial-up connection).

Among those not owning personal computer, there are many people wanting to use the Internet, but not daring to buy a personal computer. Some are hesitant to operate the personal computer. Among those people, it seems many people want to use the Internet, if possible, without using the personal computer.

In such background, lately, the Internet television allowing to use the Internet easily by the television receiver is proposed. That is, the Internet information is displayed by using the television receiver in the general household as the display of the personal computer. Accordingly, without having to purchase a personal computer, only a device for receiving the Internet information is built in or attached to the television receiver, and such device is easy to handle as compared with the personal computer, and the television receiver functions its original purpose while not reviewing the Internet information, which is very convenient for the user.

By the way, in the Internet communication, depending on the busy line state, time may be required to connect to the desired information source. Accordingly, the user of the Internet television as an Internet information displaying apparatus may have occasions desiring to watch a scene as a television broadcast program and the screen of the Internet communication at the same time. Therefore, there has been desired the realization of the Internet information displaying apparatus which can display simultaneously the television broadcast program and the screen of the Internet communication until connection is realized with the desired information source, or, without being limited to the duration of connecting operation, can simultaneously display both the television program and the Internet communication screen at any time.

However, recently, in the television receiver, the users have had the increased opportunities to watch not only the television programs on the television broadcasts but also the picture signals from VTR (Video Tape Recorder) or LD (Laser Disk) or the picture signals from the computer game players.

Among these picture signals from many signal sources, there are not only the interlaced signals like ordinary television broadcasts but also non-interlace signals. Especially, the blue back signals of VTR and LD and the picture signals of computer game players come under this category.

In this case, in displaying the non-interlace picture signals on the television screen and the Internet picture signals on the Internet screen visually right and left on an Internet television, in the picture FIFO circuit on the Internet circuit the Internet picture signals are to be outputted with the timing of being prepared on the basis of the synchronizing signal by the picture signal of the television screen.

On the other hand, in the Internet information displaying apparatus, using the judgment result made by judging Odd/Even simultaneously with using the horizontal synchronizing signal and the vertical synchronizing signal of the picture signals of the television screen, interruption of vertical synchronous period is performed to carry out control of the address of RAM for DMA, so as to have the Internet screen display made on each Odd/Even line.

For this reason, in case where the television screen is a non-interlace picture signal, Odd/Even as described above cannot be judged. Accordingly, only the picture signal of any field of Odd/Even is to be outputted based on each field (e.g., with the ODD only, the Odd field only is outputted).

As a result, as the Internet screen is scanned only on one field, the vertical resolution becomes 1/2 to cause collapse of display. Especially, since the Internet screen includes characters in addition to the images, there is an additional problem of difficulty to observe the display.

Furthermore, in the Internet information displaying apparatus, there can be adopted a use method of turning the Internet screen display off and instead enjoying the television program by displaying the television screen on, during the interval of down-loading the Internet text or image data.

In this case, though the Internet screen is in display off state, the Internet circuit is in operating condition because of the down-loading operation. Since the Internet circuit is operating in spite of the non-display of the Internet screen, there is a likelihood for the DMA function for actuating the display operation to be kept in operating state.

In case of the state being as above, the DMA function is to occupy the bus, and the time allowed for the CPU to use the bus is shortened, so that there is a possibility for delaying the data down-loading. Also, due to the actuation of the DMA function, the electric current for reading out data from the RAM is consumed. The current consumption for access to the RAM is non-negligibly large. Moreover, there occurs interference with the television screen by the unnecessary radiation due to the reading out of RAM data and by the picture signal to be outputted from the Internet circuit. The effect is large especially when the television broadcast is in weak electric field.

Furthermore, in the Internet information displaying apparatus, the television program and the Internet screen can be displayed simultaneously on the respective half sides of a screen, as shown in FIG. 2. In this way, when the two picture signals with the aspect ratio of 4:3 are displayed by half screen each, in a wide screen having the aspect ratio of 16:9, as shown in FIG. 3B, the ratio of the area (broken line portion) displayed on the screen of side widths D, E to the side widths d, e of the whole area (solid line portion) of the picture signal in the respective half screens becomes 85%. Against this, as shown in FIG. 3A, in case of the display of the picture signal for the screen having the aspect ratio of 4:3 on the whole wide screen having the aspect ratio of 16:9, the ratio of the side width C of the area (broken line portion) displayed on the screen to the side width c of the whole area of the picture signal (solid line portion) is 90%.

In case of displaying on the whole wide screen having the aspect ratio of 16:9, contrivance is made so that the area near the central part of the screen is displayed in nearly right circle, and right and left peripheral parts of the screen are stretched sideways, and also the area not displayed on the screen is lessened. In case of displaying half and half on a wide screen having the aspect ratio of 16:9, the display images are slightly extended in the vertical direction so as to make the portions not displayed on either side less, and to prevent the images to be displayed from becoming excessively small.

As a result of the setting of the ratios and the extensions as mentioned above, in case of displaying two scenes on half screen each on a wide screen having the aspect ratio of 16:9, in displaying letters, the characters at the right and left end parts of the line are not displayed, and in reading the hidden part, the steps of scrolling the screen to right and left are required. Alternatively, the size of the letters to be displayed is reduced to make the whole lines displayed, in which case there are separately required small size fonts.

Furthermore, it can occur for the users of the Internet television as an Internet information displaying apparatus to be much devoted on the Internet information searching and eventually miss the television program which had originally been intended to see. Accordingly, there has been desired an Internet television with which the television programs can be reserved by presetting, so that the television program can be displayed on the screen at the reserved time even during the Internet information searching.

BRIEF SUMMARY OF THE INVENTION

The present invention has been developed in the light of the situation as above. Its primary object is to provide an Internet information displaying apparatus having a handy constitution in which, in an Internet information displaying apparatus possessing both the Internet receiving function and the function to display picture signals reproduced, for example, from the television broadcast, video cassette, digital video disk, etc., both the television program and the Internet screen can be simultaneously displayed.

The second object of the invention is to provide an Internet information displaying apparatus with which the television program can be displayed at any time during the operation of connection with Internet and under the condition of being connected with Internet, and also, during the operation of connection with Internet, the television program can be automatically displayed.

Furthermore, the third object of the invention is to provide an Internet information displaying apparatus with which, when it is possible to display the screen by dividing into two parts of left and right, even if a non-interlace picture signal of television screen is inputted to one of the two divisional screen, display can be made without lacking the image data in the vertical direction of the other Internet screen.

Furthermore, the fourth object of the invention is to provide an Internet information displaying apparatus in which, in case of the television screen being watched while the Internet data is being received through the Internet circuit, interference of unnecessary radiation by Internet circuit is eliminated, the electric current consumption of the device is reduced, and high speed data down-load is realized.

The fifth object of the invention is to provide an Internet information displaying apparatus with which, in displaying both the television program and the Internet screen half and half, the characters of the Internet screen can be displayed in easily discernible manner.

Additionally, the sixth object is to provide an Internet information displaying apparatus with which the television program can be reserved, and even if the Internet information searching is in progress at the starting time of the reserved television program, the reserved television program can be displayed on the screen.

The first aspect of the Internet information displaying apparatus according to the present invention comprises: picture signal outputting means for extracting a first picture signal from a video signal and outputting it; data converting means for converting-digital data taken in from the Internet through a communication line into a second picture signal; a displaying apparatus for displaying a picture signal on a screen; first horizontal direction compressing means for compressing the first picture signal in the horizontal direction of the screen of the displaying apparatus; second horizontal direction compressing means for compressing the second picture signal in the horizontal direction of the screen of the displaying apparatus; picture composing means for composing the picture signals compressed by the first horizontal direction compressing means and the second horizontal direction compressing means, respectively, in a row; and switching means for switching the picture signal to be displayed on the screen of the displaying apparatus into any of the first picture signal, the second picture signal, and the picture signal composed by the picture signal composing means.

According to the first aspect of the Internet information displaying apparatus of the present invention as above, it is possible to realize an Internet information displaying apparatus having handy constitution capable of displaying simultaneously the television program and the Internet screen.

The second aspect of the Internet information displaying apparatus according to the present invention is characterized in that, in the first aspect, the first horizontal direction compressing means and the second horizontal direction compressing means both have line memories which store the picture signals in the unit of the scanning line, and in the first horizontal direction compressing means, the first picture signal is written in by the write clock of the multiple frequency of the horizontal synchronizing signal extracted from the video signal, and the first picture signal is read out by the read clock of the double frequency of the write clock.

According to the second aspect of the Internet information displaying apparatus of the present invention as above, it is possible for the picture signal read out from the first horizontal direction compressing means to be compressed to 1/2 in the horizontal direction, to have the picture signal and the picture signal compressed to 1/2 by the second horizontal direction compressing means composed in a row, and display the picture on a television screen.

The third aspect of the Internet information displaying apparatus according to the present invention is characterized in that, in the first aspect, the first horizontal direction compressing means and the second horizontal direction compressing means both have line memories which store the picture signals in the unit of the scanning line, and in the second horizontal direction compressing means, the second picture signal is written in by carrying out DMA (Direct Memory Access) with the timing based on the horizontal synchronizing signal and vertical synchronizing signal extracted from the video signal.

According to the third aspect of the Internet information displaying apparatus of the present invention as above, the line memory on the Internet screen side is read out in synchronization with the vertical synchronizing signal and the line-locked clock, because of which there is not required any complicated circuit for obtaining synchronization between the two picture signals. Accordingly, it is possible to realize the Internet information displaying apparatus having a simple constitution which is capable of displaying the television program and the Internet screen at the same time.

The fourth aspect of the Internet information displaying apparatus according to the present invention is characterized in that, in the first aspect, the first horizontal direction compressing means and the second horizontal direction compressing means both have line memories which store the picture signals in the unit of the scanning line, in the first horizontal direction compressing means, the first picture signal is written in by the write clock of the multiple frequency of the horizontal synchronizing signal extracted from the video signal, and the first picture signal is read out by the read clock of the double frequency of the write clock, and in the second horizontal direction compressing means, the second picture signal is written in by carrying out DMA (Direct Memory Access) with the timing based on the horizontal synchronizing signal and vertical synchronizing signal extracted from the video signal.

According to the fourth aspect of the Internet information displaying apparatus of the present invention as above, the picture signal read out from the first horizontal direction compressing means is compressed to 1/2 in the horizontal direction, and it is possible to compose in a row, the picture signal and the picture signal which has been compressed to 1/2 by the second horizontal direction compressing means and display them on a television screen. Furthermore, by reading out the line memory on the Internet screen side in synchronization with the horizontal synchronizing signal and the vertical synchronizing signal on the television screen side and the line-locked clock, there is required no complicated circuit for having the two video signals synchronized. Accordingly, it is possible to realize the Internet information displaying apparatus having a simple constitution which is capable of displaying the television program and the Internet screen at the same time.

The fifth aspect of the Internet information displaying apparatus according to the present invention comprises: picture signal outputting means for extracting a first picture signal from a video signal and outputting it; Internet connecting means for taking in digital data from a computer connected with the Internet through a communication line; data converting means for converting digital data taken in by the Internet connecting means to the second picture signal; a displaying apparatus for displaying a picture signal on a screen; Internet relating picture signal generating means for generating a picture signal relating to the second picture signal; and switching means for switching the picture signal to be displayed on the screen of the displaying apparatus into any of the first picture signal, the second picture signal, and the picture signal generated by the Internet relating picture signal generating means; wherein the switching means output the first picture signal compulsorily to the displaying apparatus to display on the screen during the waiting time until the communication line is connected to the computer and/or the period during which the communication line is connected with the computer.

According to the fifth aspect of the Internet information displaying apparatus of the present invention as above, during the connection operation with the Internet and/or under the condition of being connected with Internet, the television program can be displayed at any time.

The sixth aspect of the Internet information displaying apparatus according to the present invention further comprises, in addition to the fifth aspect, operation start detecting means for detecting the start of operation for the communication line to be connected with the computer; and connection completion detecting means for detecting the completion of connection between the communication line with the computer; wherein the switching means, at the time when the operation start detecting means detects the start of operation, outputs the second picture signal to cause display on the screen of the displaying apparatus, and at the time when the connection completion detecting means detects the completion of connection, outputs the Internet relating picture signal to cause display on the screen of the displaying apparatus.

According to the sixth aspect of the Internet information displaying apparatus of the present invention as above, during the connection operation with the Internet, the television program can be automatically displayed.

The seventh aspect of the Internet information displaying apparatus according to the present invention comprises: picture signal outputting means for extracting a first picture signal from a video signal and outputting it; a displaying apparatus for displaying a picture signal on a screen; first horizontal direction compressing means for compressing the first picture signal in the horizontal direction of the screen of the displaying apparatus; storing means for storing digital data as a second picture signal taken in from the Internet corresponding to the picture signal of at least one frame; second horizontal direction compressing means for compressing the digital data as the second picture signal stored in the storing means in the horizontal direction of the screen of the displaying apparatus; picture composing means for composing the picture signal compressed by the first horizontal direction compressing means and the second horizontal direction compressing means, respectively, in a row; displaying means for displaying the picture signal from the picture composing means on the screen of the displaying apparatus; judging means for judging whether the first picture signal extracted from the video signal is non-interlace or interlace; and controlling means for controlling in a manner to output the digital data stored in the storing means to the second horizontal direction compressing means by adjusting with the field of the first picture signal when judged to be interlace by the judging means, and to output the digital data stored in the storing means to the second horizontal direction compressing means on each field when judged to be non-interlace by the judging means.

The eighth aspect of the Internet information displaying apparatus according to the present invention is characterized in that, in the seventh aspect, the judging means judges by comparison as to whether the present field and the preceding field of the picture signals are the same fields of odd number or even number or the different fields.

The ninth aspect of the Internet information displaying apparatus according to the present invention is characterized in that, in the seventh aspect, when the judging means judges to be non-interlace, controls to output the digital data of the different field on the field of the second picture signal respectively to the second horizontal direction compressing means from the digital data stored in the storing means.

The tenth aspect of the Internet information displaying apparatus according to the present invention is characterized in that, in the seventh aspect, the first horizontal direction compressing means and the second horizontal direction compressing means both have line memories which store the picture signals in the unit of the scanning line, in the first horizontal direction compressing means, the first picture signal is written in by the write clock of the multiple frequency of the horizontal synchronizing signal extracted from the second picture signal, and the first picture signal is read out by the read clock of the double frequency of the write clock, in the second horizontal direction compressing means, the second picture signal is written in by carrying out DMA (Direct Memory Access) with the timing based on the horizontal synchronizing signal and vertical synchronizing signal extracted from the second picture signal, and in the storing means, the second picture signal is read out by carrying out DMA (Direct Memory Access) with the timing based on the horizontal synchronizing signal and vertical synchronizing signal extracted from the second picture signal.

According to the seventh through tenth aspects of the Internet information displaying apparatus of the present invention, even if a non-interlace picture signal is inputted to one side of the screen having two divisional parts on a television screen, it is possible to display without causing omission of the picture data in the vertical direction on the other Internet screen.

The eleventh aspect of the Internet information displaying apparatus according to the present invention comprises: picture signal outputting means for extracting a first picture signal from a video signal and outputting it; storing means for storing digital data taken in from the Internet through a communication line; video FIFO means for storing the digital data stored in the storing means by one line as data of the second picture signal; writing means for writing in the video FIFO means the digital data stored in the storing means as the data for the picture signal; a displaying apparatus for displaying a picture signal on a screen; DMA (Direct Memory Access) means for controlling the writing means; distinguishing means for distinguishing the period for not displaying data of the second picture signal on the screen of the displaying apparatus; DMA request signal outputting means for outputting to the DMA means a DMA request signal which requests DMA operation from the writing means; and controlling means for controlling the DMA request signal outputting means to stop the DMA means, depending on the distinguish result of the distinguishing means.

The twelfth aspect of the Internet information displaying apparatus according to the present invention is characterized in that, in the eleventh aspect, the data stored in the video FIFO means cause to make "0" when displaying state of the second picture signal to the screen of the displaying apparatus becomes OFF.

The thirteenth aspect of the Internet information displaying apparatus according to the present invention is characterized in that, in the eleventh aspect, the data stored in the video FIFO means cause to make all the same for one line when displaying state of the second picture signal to the screen of the displaying apparatus becomes OFF.

According to the eleventh through thirteenth aspects of the Internet information displaying apparatus, in case where a television screen is watched under the condition of receiving the Internet data in the Internet circuit, interference of unnecessary radiation by Internet circuit is eliminated, and current consumption is reduced and data downloading is made high speed.

The fourteenth aspect of the Internet information displaying apparatus according to the present invention comprises: picture signal outputting means for extracting a first picture signal from a video signal and outputting it; data converting means for converting digital data taken in from the Internet through a communication line into a second picture signal; a displaying apparatus for displaying a picture signal on a screen; first horizontal direction compressing means for compressing the first picture signal in the horizontal direction of the screen of the displaying apparatus; second horizontal direction compressing means for compressing the second picture signal in the horizontal direction of the screen; picture composing means for composing the picture signals compressed by the first horizontal direction compressing means and the second horizontal direction compressing means, respectively, in a row; trimming means for trimming the number of characters to be displayed per line of a half screen on the second picture signal side smaller than the number of characters to be displayed per line of a full screen, in composing the first picture signal and the second picture signal in a row and displaying on the screen of the displaying apparatus by the picture composing means; and rearranging means for rearranging the characters to be displayed on the lines in which the number of characters has been trimmed by the trimming means, whereby displaying all the characters included in the second picture signal on the half screen.

According to the fourteenth aspect of the Internet information displaying apparatus of the present invention as above, in displaying the television program and the Internet screen half and half on a screen, the characters of the Internet screen can be displayed in easily discernible manner.

The fifteenth aspect of the Internet information displaying apparatus according to the present invention is characterized in that, in the fourteenth aspect, the trimming means has an image memory which has a region to store the second picture signal to be displayed on the half screen at the time of composing the first picture signal and the second picture signal in a row and displaying them on the screen of the displaying apparatus, and the picture signal to be displayed on the half-screen is read out from the region when composing the first and second picture signals in a row and displaying them on the screen.

According to the fifteenth aspect of the Internet information displaying apparatus of the present invention as above, in displaying the television program and the Internet screen half and half on a screen, the characters of the Internet screen can be displayed in easily discernible manner.

The sixteenth aspect of the Internet information displaying apparatus according to the present invention comprises: picture signal outputting means for extracting a first picture signal from a television signal and outputting it; data converting means for converting digital data taken in from the Internet through a communication line into a second picture signal; a displaying apparatus for displaying a picture signal on a screen; Internet relating picture signal generating means for generating a picture signal relating to the second picture signal; switching means for switching the picture signal for displaying on the screen of the displaying apparatus to either the picture signal relating to the Internet or the first picture signal; storing means for storing the time to be switched by the switching means, and the television channel to be selected at the time; selecting means for selecting the television channel; and clocking means; wherein, in case where the picture signal relating to the Internet is displayed on the screen of the displaying apparatus, when the time indicated by the clocking means reaches the time, the switching means switches to the first picture signal, and the selecting means selects the television channel stored in the storing means.

According to the sixteenth aspect of the Internet information displaying apparatus of the present invention as above, the television program may be reserved, and as the television program is displayed on the screen at the starting time of the television program even during the searching of the Internet information. Therefore, the user does not miss the desired television program.

The above and further objects and features of the invention will more fully be apparent from the following detailed description with accompanying drawings.

DESCRIPTION OF THE PREFERRED EMBODIMENTS

Figure 1:
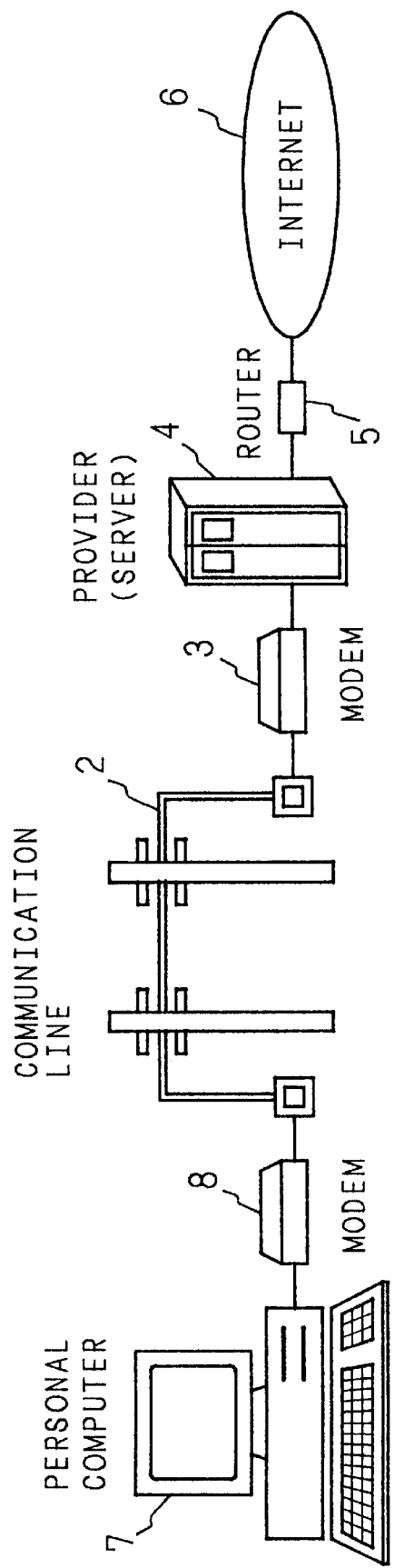
FIG. 1 is a schematic diagram showing a conventional connection example of computer and Internet.

Referring now to the drawings, preferred embodiments of the invention are described below.

Figure 4:
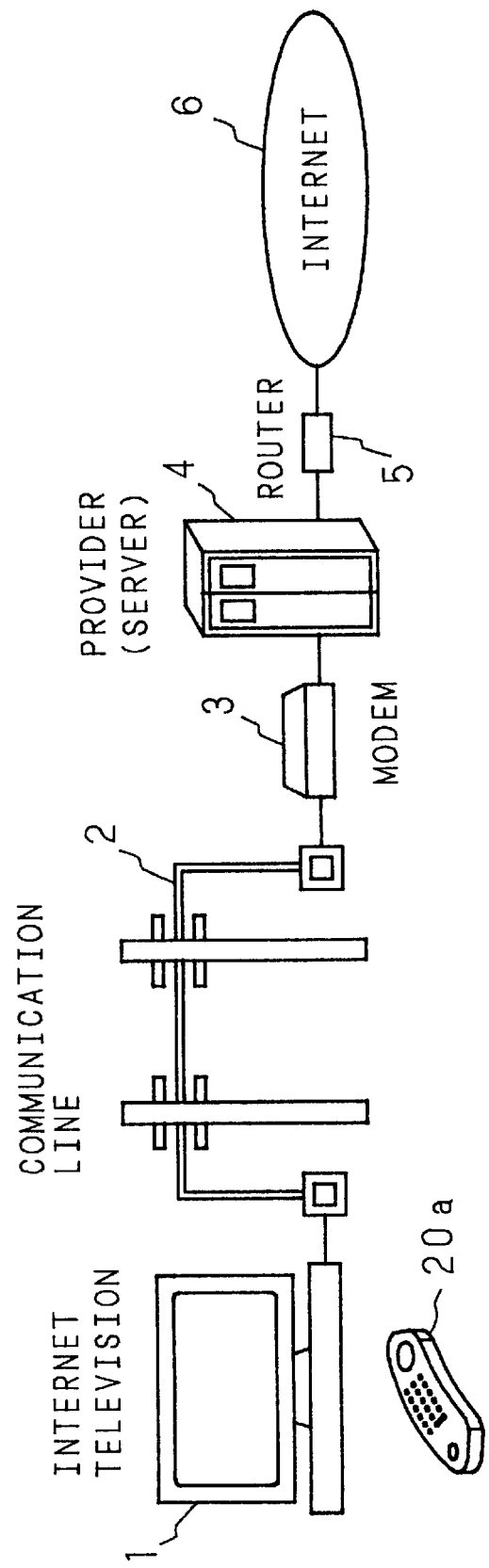
FIG. 4 is a schematic diagram showing a connection example of an Internet information displaying apparatus of the invention and Internet.

FIG. 4 is a schematic diagram showing a connection example of an Internet television as an embodiment of an Internet information displaying apparatus of the invention and the Internet. In this connection example, an Internet television 1 remote controlled by a remote controller 20a is connected to a communication line 2. A modem is built in the Internet television 1. The communication line 2 is connected to a modem 3 or terminal adapter of a provider as a connection service firm, and the modem 3 is connected to a server 4 which is the provider's computer.

The server 4 is connected to the Internet 6 around the clock, and is connected to the Internet 6 through a router 6 for setting the trunk route.

From the Internet television 1, when the remote controller 20a is operated, the telephone is called automatically to connect to the Internet 6 through the server 4 of the provider (dial-up connection).

Figure 5:
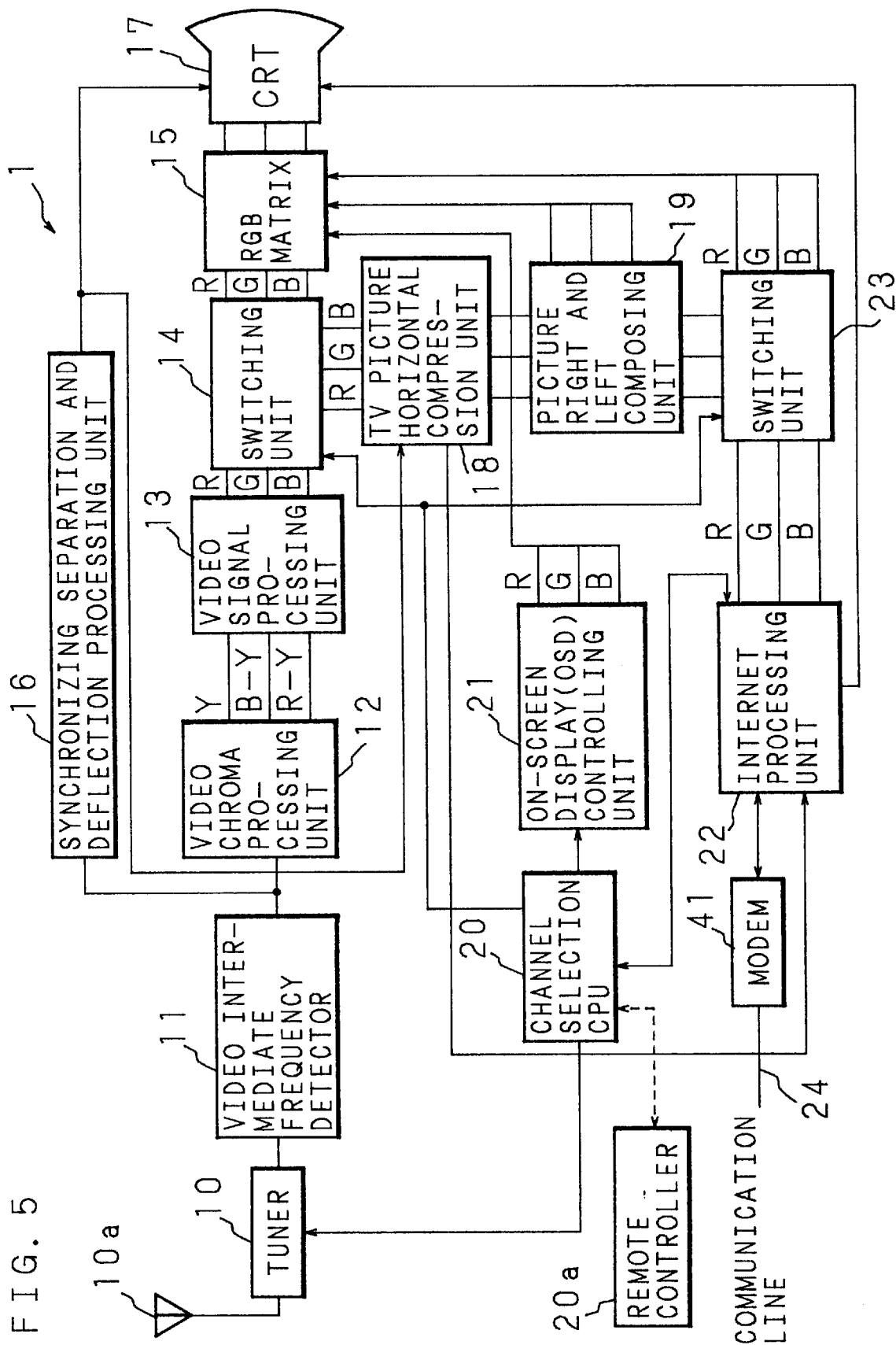
FIG. 5 is a block diagram showing an essential constitution of an embodiment of an Internet information displaying apparatus of the invention.
Figure 8:
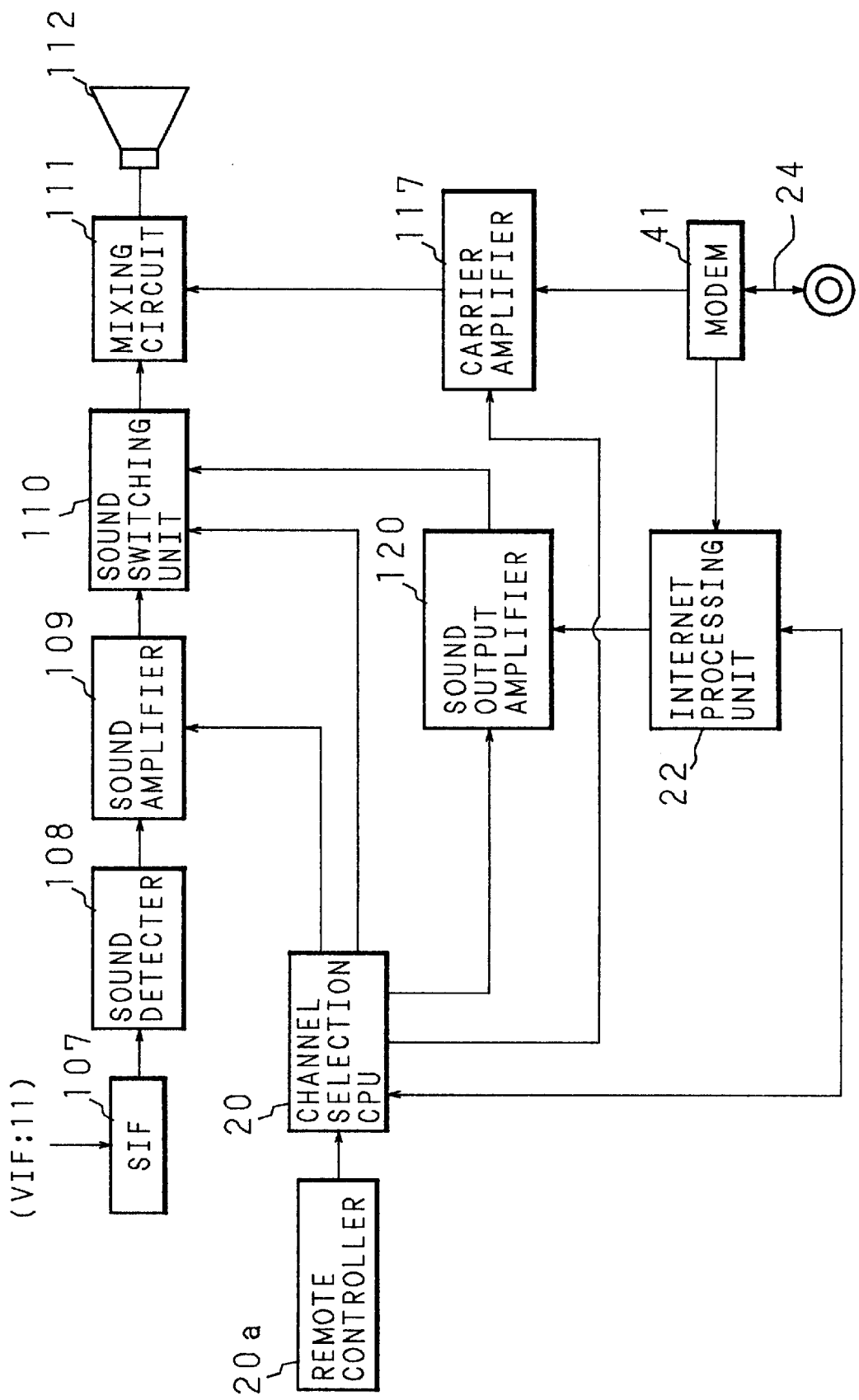
FIG. 8 is a block diagram showing an essential constitution of sound system of an embodiment of an Internet information displaying apparatus of the invention.

FIG. 5 is a block diagram showing an essential constitution of an embodiment of the Internet television as the Internet information displaying apparatus of the invention (the sound system is shown in FIG. 8). In this Internet television 1, the television wave received by an antenna 10a is selected by a tuner 10, and the selected television wave is sent into a video intermediate frequency detector 11, in which the video signal is detected. The detected video signal is sent into a video chroma processing unit 12, in which luminance signal Y and color difference signals B-Y, R-Y are extracted.

The extracted luminance signal Y and color difference signals B-Y, R-Y are sent into a video chroma processing unit 13, and converted into red, green and blue color signals R, G, B. These color signals R, G, B are applied to an RGB matrix 15 through a switching unit 14, and outputted to a CRT 17 in each color.

The video signal detected by the video intermediate frequency detector 11 is also given to a synchronizing separation and deflection processing unit 16, and a vertical synchronizing signal and a horizontal synchronizing signal are extracted. The extracted vertical synchronizing signal and horizontal synchronizing signal are given to the CRT 17, and are used as the synchronizing signal for screen scanning.

The color signals R, G, B converted by the video chroma processing unit 13 are also given to a TV picture horizontal compression unit 18 through the switching unit 14. The TV picture horizontal compression unit 18 has a line memory for storing the picture signal of every scanning line, and generates a write clock of 4 fsc (fsc=frequency of subcarrier of color) at a multiple frequency of the horizontal synchronizing signal given from the synchronizing separation and deflection processing unit 16, and a picture signal is written in. When reading out the picture signal, a read clock at double frequency 8 fsc of the write clock is generated, and is given to a picture right and left composing unit 19.

On the other hand, an Internet processing unit 22 connected to a communication line 24 extracts red, green and blue color signals R, G, B of the picture signal from the data given through the communication line 24, and these color signals R, G, B are given to an RGB matrix 15 through a switching unit 23, and outputted to the CRT 17 in each color.

The Internet processing unit 22, when displaying the Internet screen only, generates a vertical synchronizing signal and a horizontal synchronizing signal independently, and these vertical synchronizing signal and horizontal synchronizing signal are given to the CRT 17 and used as the synchronizing signal for screen scanning.

When instructed from the remote controller 20a, the Internet processing unit 22 writes in the picture signal by making a direct memory access (DMA) at the timing generated on the basis of the horizontal synchronizing signal and vertical synchronizing signal given from the TV picture horizontal compression unit 18, reads it out by the read clock at frequency of 8 fsc locked in line to the horizontal synchronizing signal, and gives it to the picture right and left composing unit 19 through the switching unit 23.

The color signals R, G, B outputted from the Internet processing unit 22 are also given to the picture right and left composing unit 19 through the switching unit 23.

The picture right and left composing unit 19 composes the picture signals given from the TV picture horizontal compression unit 18 and Internet processing unit 22 in the horizontal direction, and the composed video signal is given to the RGB matrix 15, and outputted to the CRT 17 in each color.

The channel selection CPU 20 outputs a channel selection instruction signal to the tuner 10 according to the instruction by the light signal, radio wave signal or the like from the remote controller 20a, and exchanges signals with the Internet processing unit 22, thereby operating and controlling the Internet television 1. If necessary, moreover, an instruction signal is also given to an on-screen display (OSD) controlling unit 21, and the picture signal from the OSD controlling unit 21 is given to the RGB matrix 15.

The channel selection CPU 20 also outputs a changeover signal of the mode for displaying the Internet screen in the entire display screen area, and the mode for displaying the television program and Internet screen simultaneously to the switching unites 14 and 23.

Figure 6:
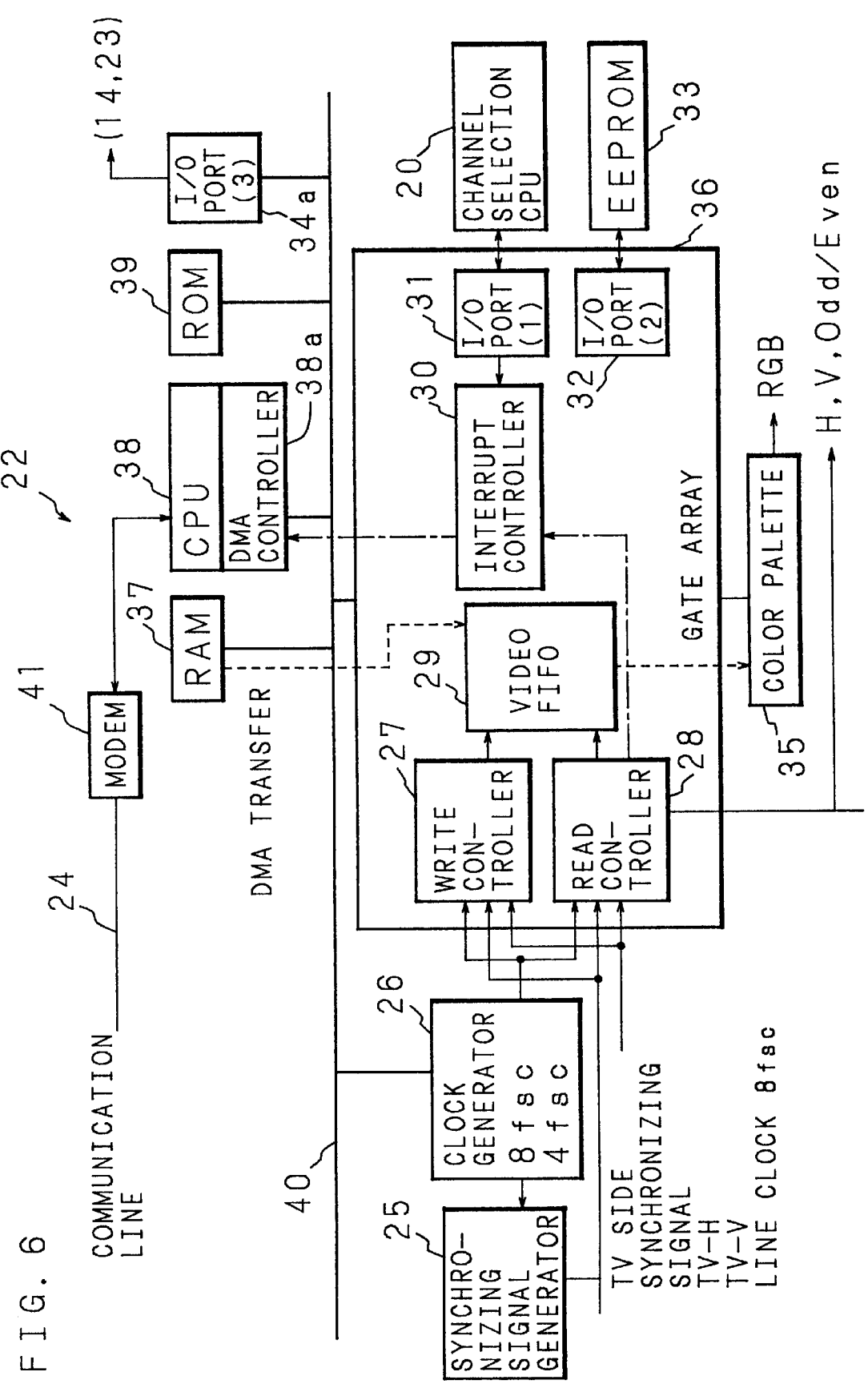
FIG. 6 is a block diagram showing a constitution of Internet processing unit of an Internet information displaying apparatus of the invention.

FIG. 6 is a block diagram showing a constitution of the Internet processing unit 22. In this Internet processing unit 22, a modem 41 connected to the communication line 24 is connected to a CPU 38, and the CPU 38 is connected to a RAM 37, a ROM 39, a clock generator 26, an I/O port (3) 34a, and a gate array 36 through a bus 40. The CPU 38 incorporates a DMA controller 38a.

The RAM 37 stores picture signal of data obtained through the modem 41 and others, and the ROM 39 stores the processing program of the Internet processing unit 22, picture signal of the original screen (menu screen, etc.) of the Internet television 1, and others.

A synchronizing signal generator 25 generates the original vertical synchronizing signal and horizontal synchronizing signal of the Internet processing unit 22 on the basis of the clock outputted from a clock generator 26, and gives them to the gate array 36. The clock generator 26 generates a clock of 8 fsc, and gives it to the gate array 36.

The I/O port (3) 34a outputs a signal for switching a mode for displaying the Internet screen on whole screen and a mode for displaying television program and Internet screen simultaneously.

The gate array 36 includes a video FIFO 29 which is a line memory, a write controller 27, and read controller 28. The write controller 27 receives the vertical synchronizing signal and horizontal synchronizing signal from the TV picture horizontal compression unit 18 or synchronizing signal generator 25, and also receives a write clock from the TV picture horizontal compression unit 18 or clock generator 26, and controls the writing of the video FIFO 29. The read controller 28 receives the vertical synchronizing signal and horizontal synchronizing signal from the TV picture horizontal compression unit 18 or synchronizing signal generator 25, and also receives the read clock from the TV picture horizontal compression unit 18 or clock generator 26, and controls the reading of the video FIFO 29.

The gate array 36 further includes an I/O port (1) 31 for exchanging signals with the channel selection CPU 20, an interrupt controller 30 for outputting a signal from this I/O port (1) 31 and vertical synchronizing signal as an interrupt signal of the CPU 38, and an I/O port (2) 32 for exchanging signals with an EEPROM 33 for storing telephone number, ID, password, communication log, etc.

The read controller 28 judges whether the field to be displayed next is Odd or Even according to the relation of given vertical synchronizing signal and horizontal synchronizing signal. The judged result is given to the CPU 38 by the interrupt controller 30 at the interruption timing of the vertical synchronizing signal.

In the case of one-screen display, the synchronizing signal generator 25 outputs whether the next display field is odd or even. In the case of two-screen display, the read controller 28 judges whether the next display field is odd or even from the relation of the given vertical synchronizing signal and horizontal synchronizing signal, and gives the result of judgement to the CPU 38 through the interrupt controller 30 at the interrupt timing of the vertical synchronizing signal.

The color signals R, G, B being read out from the video FIFO 29 are individually tinted finely in a color palette 35, and outputted to the switching unit 23.

Figure 7:
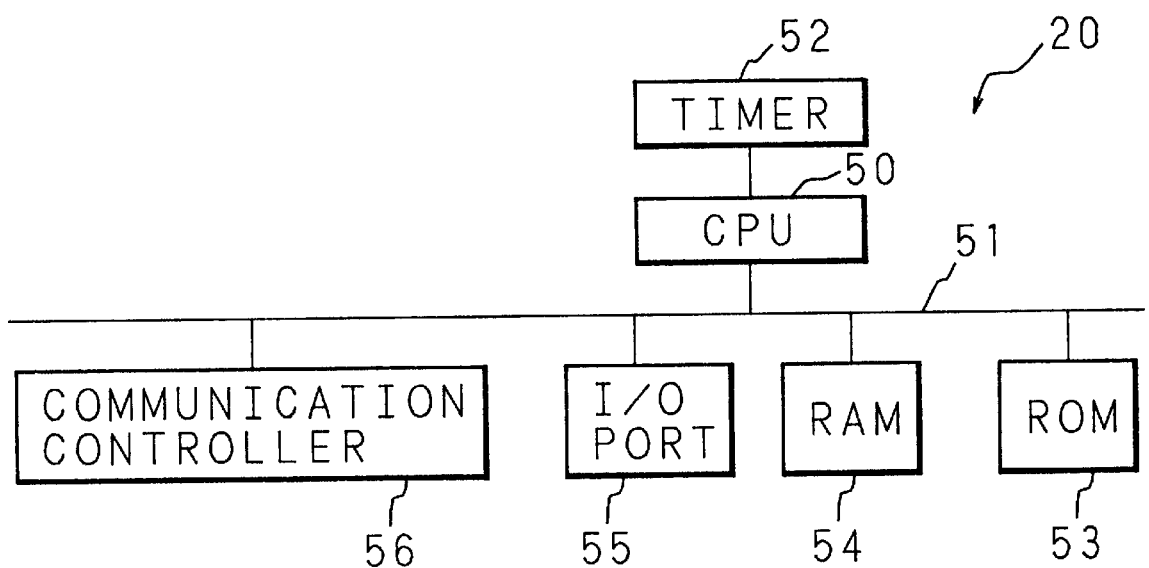
FIG. 7 is a block diagram showing a constitution of channel selection CPU of an Internet information displaying apparatus of the invention.

FIG. 7 is a block diagram showing the constitution of the channel selection CPU 20. In this channel selection CPU 20, a communication controller 56, an I/O port 55, a RAM 54, and a ROM 53 are connected through a bus 51 to a CPU 50 to which a timer 52 as clocking means is connected.

The communication controller 56 communicates with the remote controller 20a. The I/O port 55 is connected individually to the tuner 10, OSD controlling unit 21, Internet processing unit 22, power supply circuit not shown, and the like.

The RAM 54 as storing means stores the start time and channel of television program which are reserved by the user by operating an operation button provided on the remote controller 20a.

FIG. 8 is a block diagram showing an essential constitution of sound system of an embodiment of Internet television as the Internet information displaying apparatus of the invention.

Reference numeral 107 is a sound intermediate frequency (SIF) circuit, which detects an SIF signal from the output of the video intermediate frequency detector 11. Reference numeral 108 is a sound detector, which detects a sound signal from the SIF signal, and supplies to a sound amplifier 109. Reference numeral 110 is a sound switching unit for changing over a sound signal outputted from the sound amplifier 109 according to an instruction from the channel selection CPU 20 and a sound signal outputted from a sound output amplifier 120. Reference numeral 111 is a mixing circuit, which mixes the output of the sound switching unit 110 and the output of a carrier amplifier 117, and outputs the result to a speaker 112. The carrier amplifier 117 amplifies the carrier sound from the modem 41. The sound output amplifier 120 outputs the sound signal from the Internet processing unit 22.

Explained below is the operation of the Internet television as the Internet information displaying apparatus of the invention having the above constitution.

In the Internet television 1, when a mode for operating as an ordinary television is selected by the channel selection CPU 20 with operating the operating button of the remote controller 20a, the television wave received by the antenna is selected by the tuner 10 by the instruction from the channel selection CPU 20. The selected television wave is sent to the video intermediate frequency detector 11, and a video signal is detected, and from the detected video signal, luminance signal Y and color difference signals B-Y, R-Y are extracted by the video chroma processing unit 12.

The extracted luminance signal Y and color difference signals B-Y, R-Y are sent to a video chroma processing unit 13, and converted into red, green and blue color signals R, G, B. These color signals R, G, B are applied to an RGB matrix 15 through the switching unit 14, and outputted to the CRT 17 in each color.

From the video signal detected by the video intermediate frequency detector 11, a vertical synchronizing signal and a horizontal synchronizing signal are extracted by the synchronizing separation and deflection processing unit 16. The extracted vertical synchronizing signal and horizontal synchronizing signal are given to the CRT 17, and are used as the synchronizing signal for scanning.

In the Internet television 1, when a mode for operating as Internet television is predetermined by the channel selection CPU 20 with operating the operating button of the remote controller 20a, the CPU 38 is interrupted by the interrupt controller 30. When interrupted, the CPU 38 reads out the picture signal for the portion of one screen of the menu screen from the ROM 39, and sets into the RAM 37. The clock generator 26 outputs a clock, and sends it into the write controller 27 and read controller 28.

Figure 9:
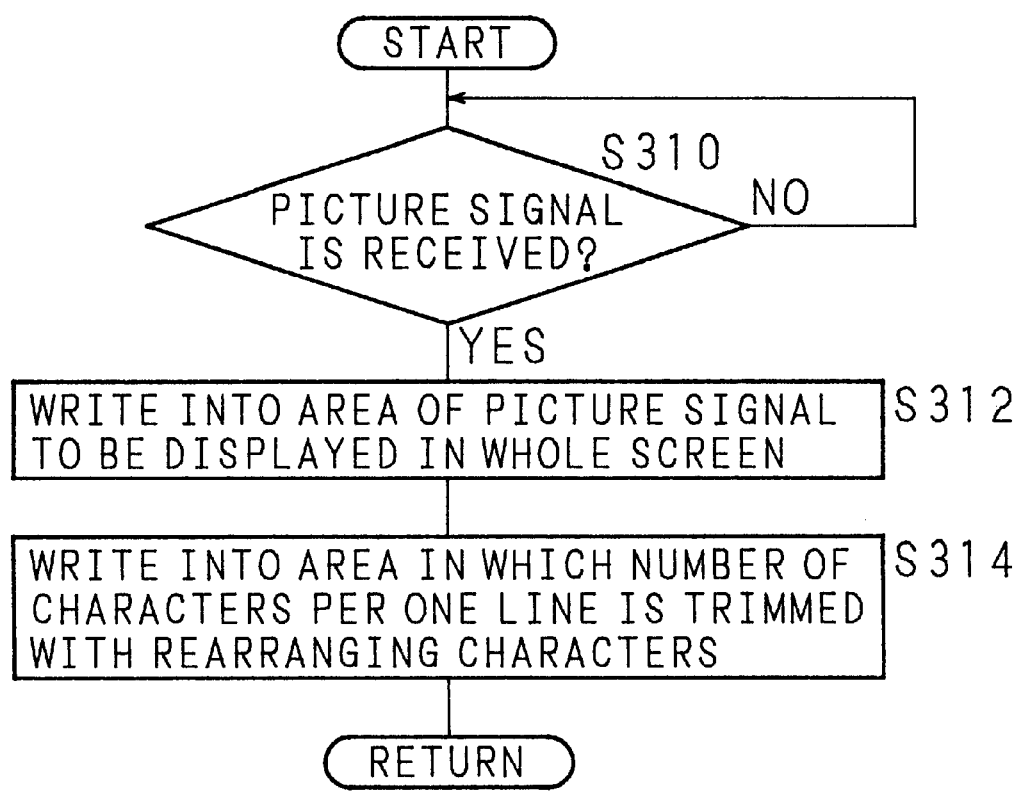
FIG. 9 is a flowchart showing an operation example of an Internet information displaying apparatus of the invention.

At this time, the CPU 38, as shown in a flowchart of FIG. 9, sets picture signal (S312) corresponding to one screen of initial screen into an area in the RAM 37 for storing picture signal of a screen whose number of characters to be displayed per one line is the number of characters (for example, 80 characters) at the mode for operating as an Internet television.

Next, the CPU 38 sets picture signal (S314) corresponding to one screen of initial screen into an area in the RAM 37 for storing picture signal of a screen whose number of characters to be displayed per one line is the number of characters (for example, 72 characters) at the mode for displaying ordinary television program and Internet screen simultaneously. At this time, characters included in the initial screen is rearranged into a predetermined number per one line.

The CPU 38 generates clock from the clock generator 26, and makes it input to the write controller 27 and the read controller 28 together with the vertical synchronizing signal and horizontal synchronizing signal outputted from the synchronizing signal generator 25.

The CPU 38 outputs switching signal from the I/O port (3) 34a to stop the output from the switching unit 14. As a result, input to the RGB matrix 15 is switched over only from the switching unit 23 and OSD controlling unit 21.

The interrupt controller 30 starts up the DMA controller 38a incorporated in the CPU 38 every time a horizontal synchronizing signal is given from the read controller 28, causes the DMA to read out color signals R, G, B of video signal for the portion of one scanning line from the RAM 37, and gives them to the video FIFO 29. In the video FIFO 29, these color signals R, G, B are written in by the write controller 27 by the write clock of 8 fsc, and read out by the read clock of 4 fsc by the read controller 28, and the color signals R, G, B being read out are given to the RGB matrix 15 through the switching unit 23, and are outputted to the CRT 17 in every color.

In the case of one-screen display, the synchronizing signal generator 25 gives the vertical synchronizing signal and horizontal synchronizing signal to the CRT 17, and they are used as the synchronizing signal when scanning the color signals R, G, B on the screen.

Figure 10:
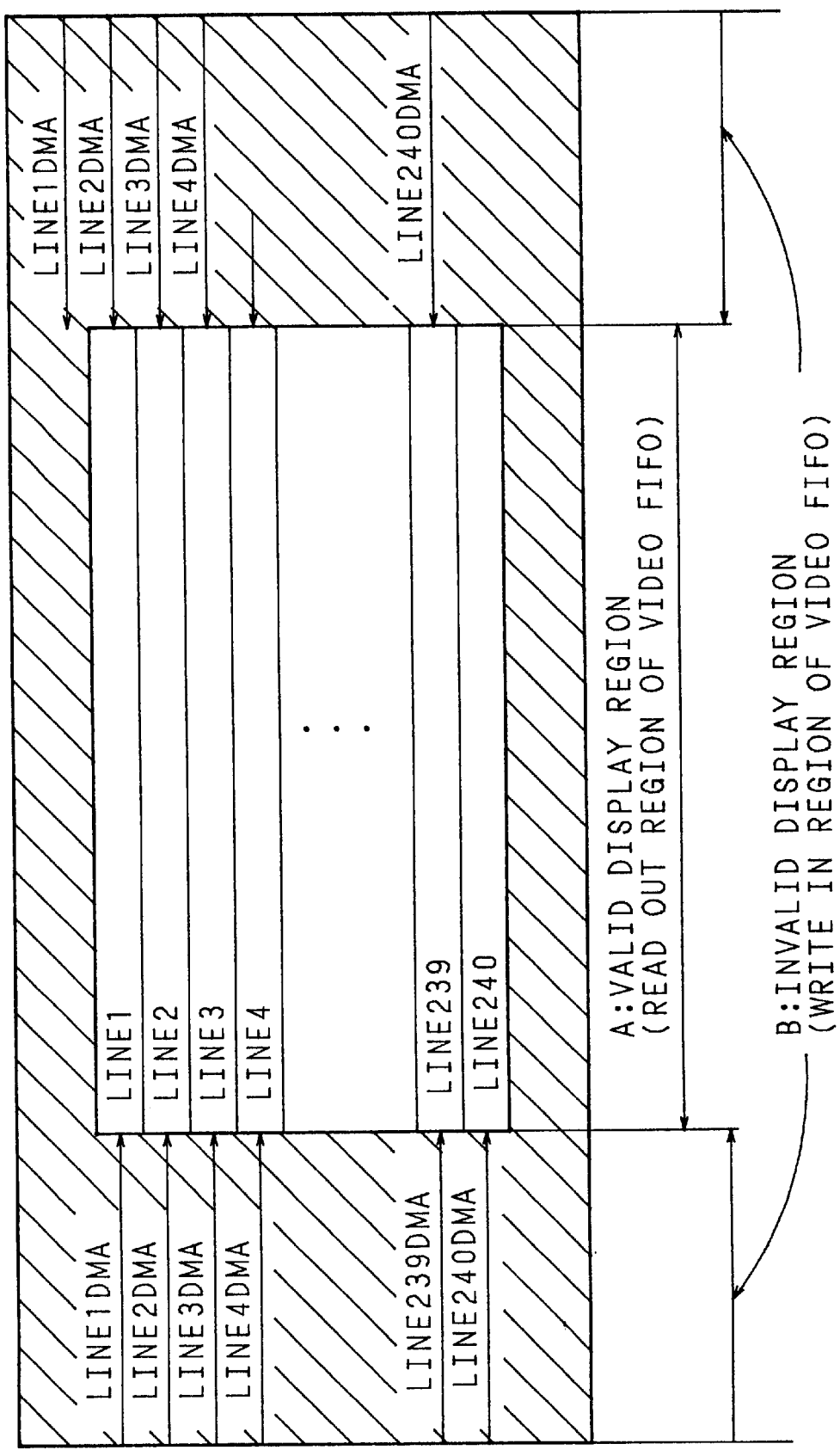
FIG. 10 is a schematic diagram showing transfer state of picture signal at the time of image display of an Internet information displaying apparatus of the invention.

At this time, the DMA controller 38a, at an area in the RAM 37 for storing picture signal of the screen whose number of characters to be displayed per one line is the number of characters (for example, 80 characters) at the mode for operating as an Internet television, as shown in FIG. 10, reads out color signals R, G, B of picture signal from the RAM 37, from one line before start of display on the display screen of the CRT 17 (upper right corner in FIG. 10) by DMA, and terminates writing into the video FIFO 29 during the period of invalid display region B (horizontal fly-back period) not displayed in the display screen of the CRT 17, and during the period of valid display region A displayed in the display screen of the CRT 17, the read controller 28 reads out from the video FIFO 29.

The read controller 28 gives judging result indicating whether the field to be displayed next is Odd or Even to the DMA controller 38a in the CPU 38 through the interrupt controller 30. According to this result, the DMA controller 38a sets the address of the RAM 37 of the picture signal to be read out.

Figure 11:
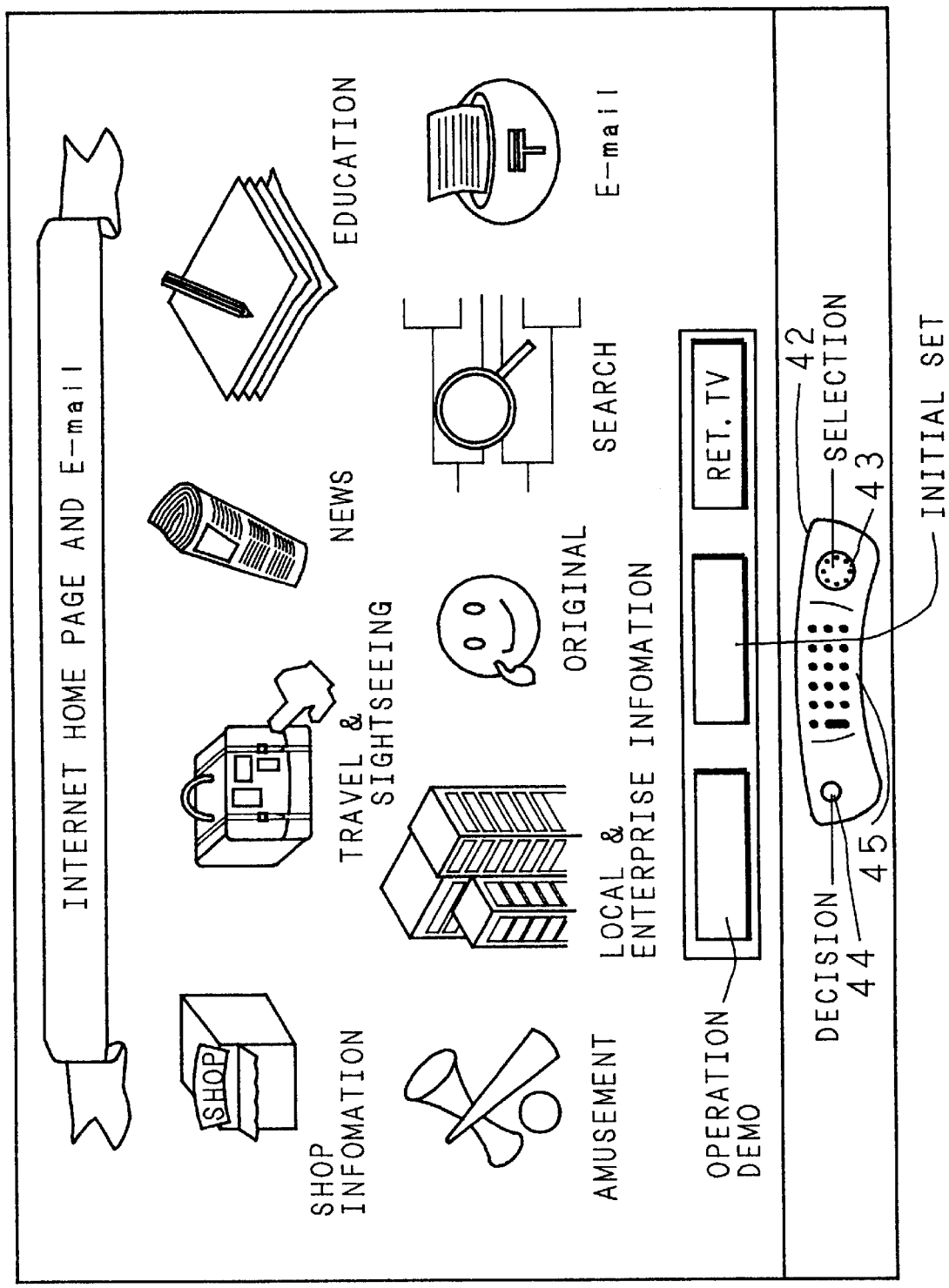
FIG. 11 is a schematic diagram showing a menu screen displayed by an Internet information displaying apparatus of the invention.

As a result, of above operation, on the screen of the CRT 17, the initial screen is displayed as shown in FIG. 11. In this case, number of characters (for example, 80 characters) at the mode for operating as an Internet television.

Figure 3A:
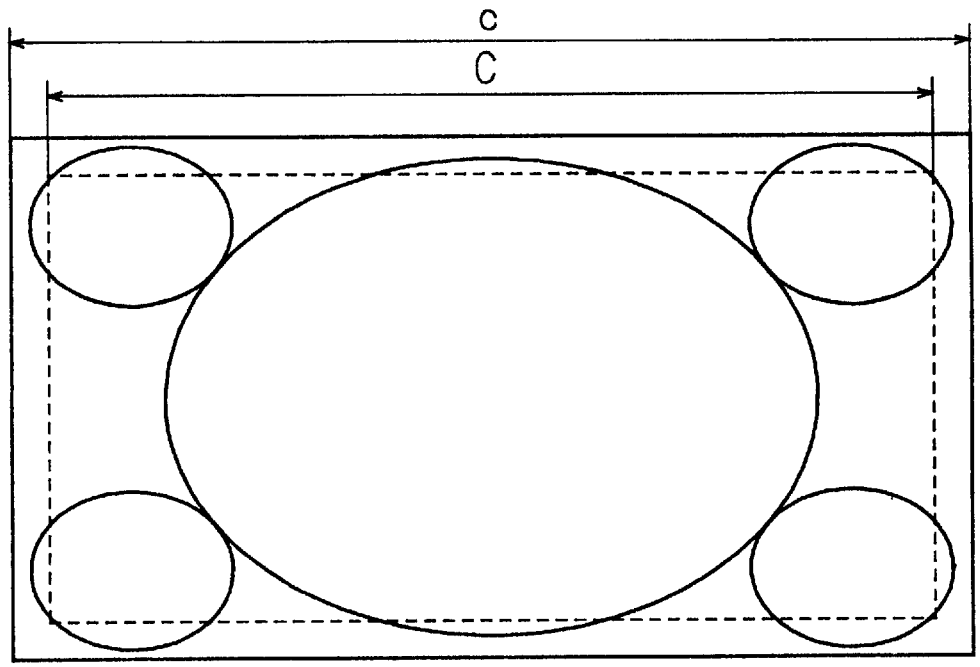
FIG. 3A is a schematic diagram showing a state in which an image having an aspect ratio of 4:3 is displayed on a whole wide screen having an aspect ratio of 16:9.

As shown in FIG. 3A, in case of the display of the picture signal for the screen having the aspect ratio of 4:3 on the whole wide screen having the aspect ratio of 16:9, the ratio of the side width C of the area (broken line portion) displayed on the screen to the side width c of the whole area of the picture signal (solid line portion) is 90%. In case of displaying on the whole wide screen having the aspect ratio of 16:9, contrivance is made so that the area near the central portion of the screen is displayed in nearly right circle, and right and left peripheral portions of the screen are stretched sideways, and also the area not displayed on the screen is lessened.

Figure 12:
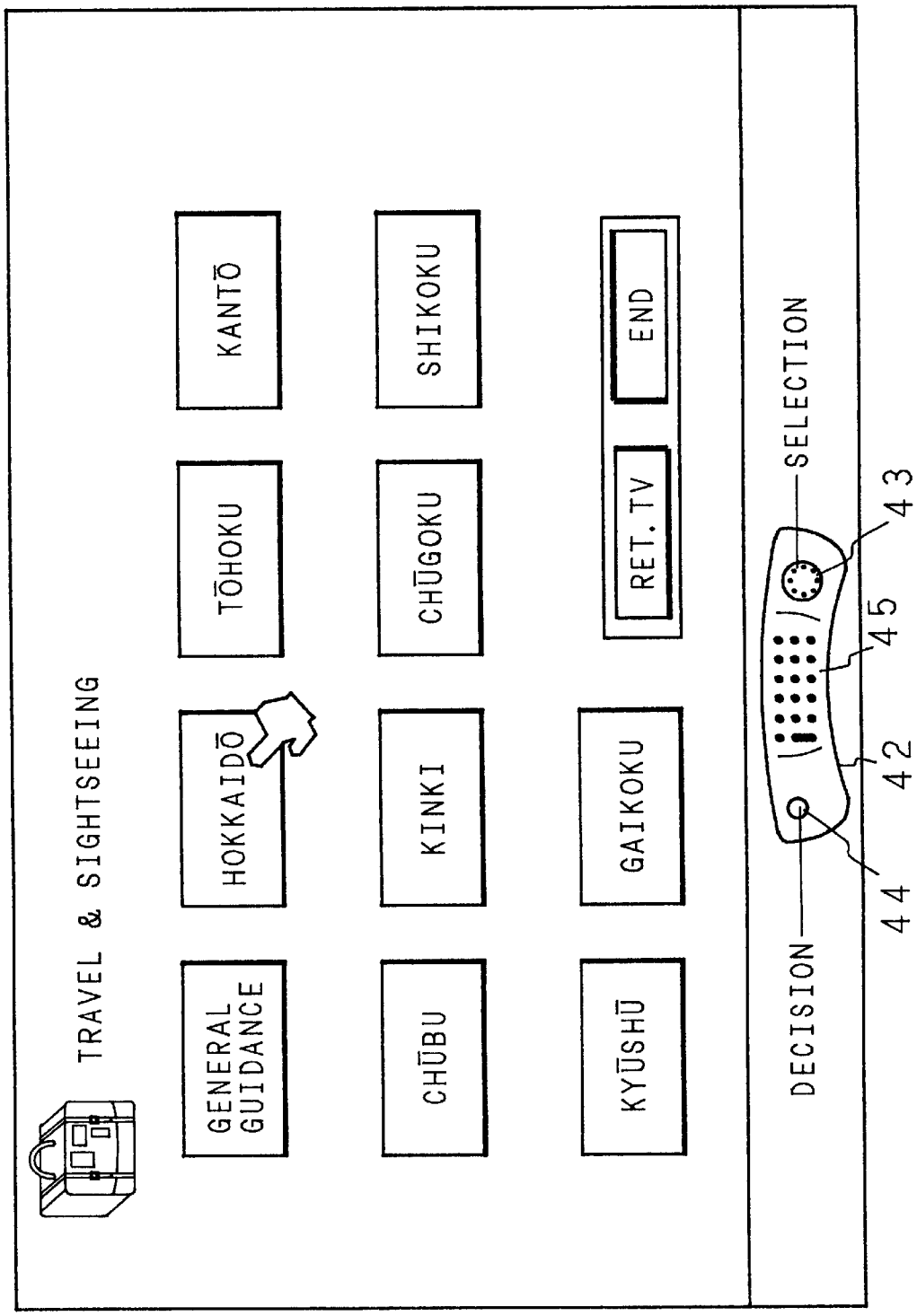
FIG. 12 is a schematic diagram showing a menu screen in a lower layer displayed by an Internet information displaying apparatus of the invention.

Among the pictures (icons) of "shop information", "travel and sightseeing", "news", education", "amusement", "local and enterprise information", "original", "search", and "E-mail" of the menu screen as shown in above-mentioned FIG, 11, when the user selects and determines the icon of, for example, "travel and sightseeing" by operating the remote controller 20a, the Internet processing unit 22 displays the selection screen of "travel and sightseeing" as shown in FIG. 12 same as mentioned above. Similarly, thereafter, every time selection is decided on the selection screen, the lower selection screen is similarly displayed consecutively like a tree.

The remote controller 20a is, as shown by a figure indicated by numeral 42 displayed at bottom of the initial screen (FIG. 11), provided with a selection button 43 displayed at the right end, a decision button 44 at the left end, and various operation button 45 in the middle. The selection button 43 can move the "index" pointer or cursor position freely in eight directions, and the picture (including the button shape) or item displayed in character string overlapping with the pointer or cursor when the decision button 44 is operated is selected and determined.

When the selection is determined and search is advanced on the selection screens, the icons relating to the searched items are read out from the ROM 39 and EEPROM 33 and displayed in the display screen. When the user operates the remote controller 20a and selects and determines from the icons, the CPU 38 reads out the telephone number of the server 4 of the provider from the EEPROM 33, and dials the telephone, and the provider's server 4 and Internet processing unit 22 are connected. When connected to the provider's server 4, the URL corresponding to the selected and decided icon is called and connected.

When the data of the home page of the connected URL is sent forth through the communication line 24 and modem 41, the CPU 38 converts the data into the picture signal, and sets in the RAM 37. The picture signal set in the RAM 37 is displayed in the display screen same as in the case of the menu screen.

When calling the URL not registered, the "URL input" of the menu screen of the browser mentioned below is selected and decided, and the URL is inputted.

Figure 13:
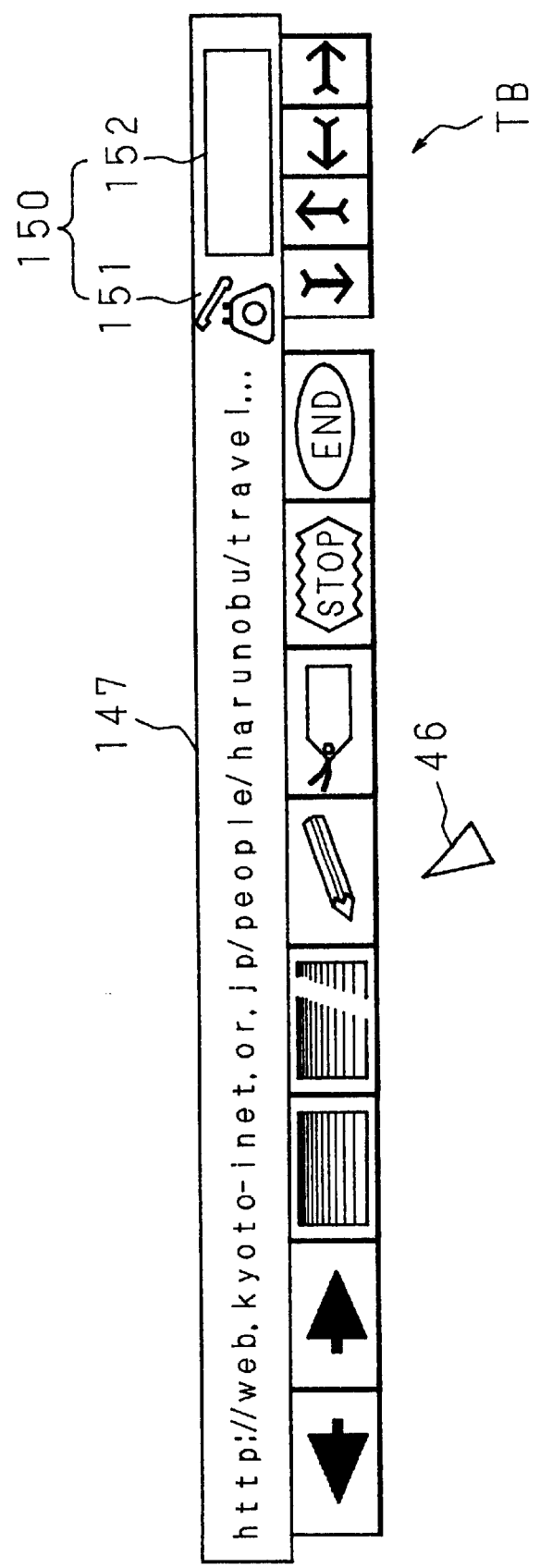
FIG. 13 is a schematic diagram showing a display example of tool bar of an Internet information displaying apparatus of the invention.
Figure 14:
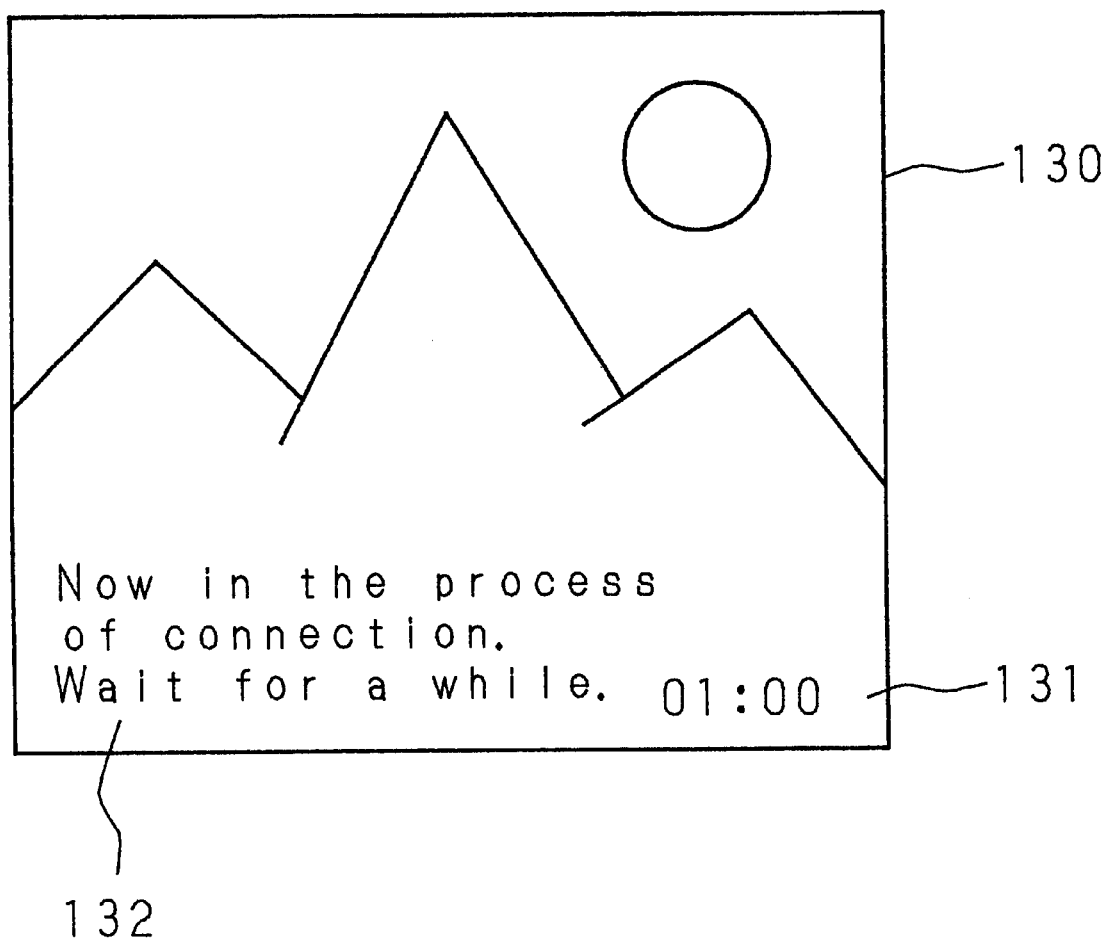
FIG. 14 is a schematic diagram showing a screen display example of an Internet information displaying apparatus of the invention.
Figure 15:
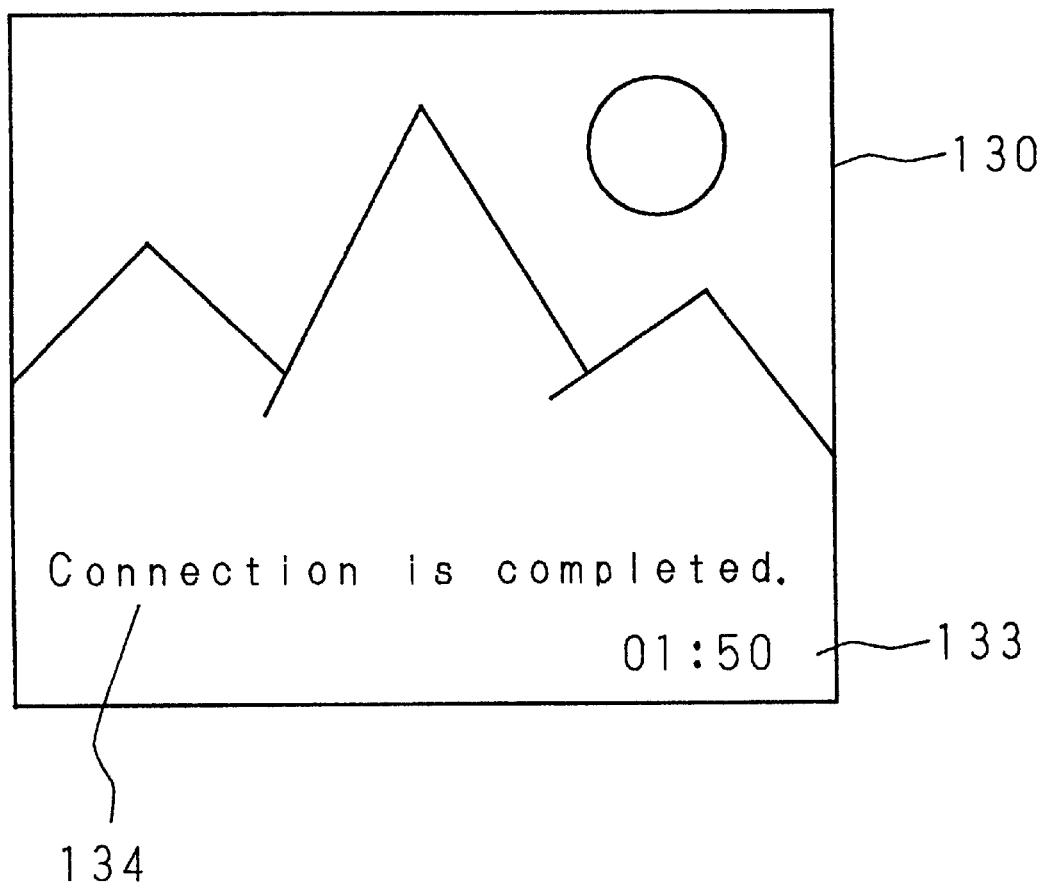
FIG. 15 is a schematic diagram showing a screen display example of an Internet information displaying apparatus of the invention.

While calling the telephone and URL, the display "Now in the process of connection" as shown in FIG. 13 or "Connection is complete" as shown in FIG. 14 appears at the bottom of the basic pattern in which the browser menu screen as shown in FIG. 15 is displayed at the top.

Herein, when the menu screen (FIG. 11) is displayed, for example, if the mode for showing the ordinary television program and Internet screen at the same time is designated by the channel selection CPU 20, the CPU 38 is interrupted by the interrupt controller 30.

The CPU 38, when being interrupted, outputs a changeover signal from the I/O port (3) 34a at this time, and changes over the output from the switching unit 14 and the output from the switching unit 23 to the TV picture horizontal compression unit 18.

In the Internet television 1, the color signals R, G, B converted into red, green and blue color signals R, G, B by the video chroma processing unit 13 are given to the TV picture horizontal compression unit 18 through the switching unit 14.

The TV picture horizontal compression unit 18 generates a write clock of 4 fsc at multiple frequency of the horizontal synchronizing signal given from the synchronizing separation and deflection processing unit 16, and writes in the color signals R, G, B of the picture signal by using it. When reading out the color signals R, G, B of the picture signal, a read clock of double frequency 8 fsc of the write clock is generated, and the color signals R, G, B are read out from the start end of the scanning line by using it, and given to the picture right and left composing unit 19.

On the other hand, the Internet processing unit 22 reads out the picture signal for the portion of one screen of the menu screen from the ROM 39, when the CPU 38 is interrupted as the mode for displaying the ordinary television program and Internet screen at the same time is designated, sets in the RAM 37, and stops the synchronizing signal generator 25 and clock generator 26.

The Internet processing unit 22 is then given with the vertical synchronizing signal, horizontal synchronizing signal, and clock of 8 fsc from the TV picture horizontal compression unit 18.

At this time, the CPU 38, as shown in the above-mentioned flowchart of FIG. 9, sets picture signal (S312) corresponding to one screen of initial screen into an area in the RAM 37 for storing picture signal of a screen whose number of characters to be displayed per one line is the number of characters (for example, 80 characters) at the mode for operating as an Internet television.

Next, the CPU 38 sets picture signal (S314) corresponding to one screen of initial screen into an area in the RAM 37 for storing picture signal of a screen whose number of characters to be displayed per one line is the number of characters (for example, 72 characters) at the mode for displaying ordinaly television program and Internet screen simultaneously. At this time, characters included in the initial screen is rearrangement into a predetermined number per one line.

The interrupt controller 30, every time a horizontal synchronizing signal is given from the read controller 28, operates the DMA controller 38a in the CPU 38. The DMA controller 38a reads out each color signal R, G, B of the picture signal corresponding to one scan line from the area in the RAM 37 for storing picture signal of the screen whose number of characters to be displayed per one line is the number of characters (for example, 72 characters) at the mode for displaying ordinary normal television program and Internet screen simultaneously, and gives them to the video FIFO 29.

In the video FIFO 29, the color signals R, G, B are written in at the timing generated by the write controller 27, and the read controller 28 reads out the picture signal from the timing of the middle point of the scanning line by the read clock of 8 fsc, and the color signals R, G, B being read out are given to the picture right and left composing unit 19 through the switching unit 23.

Figure 2:
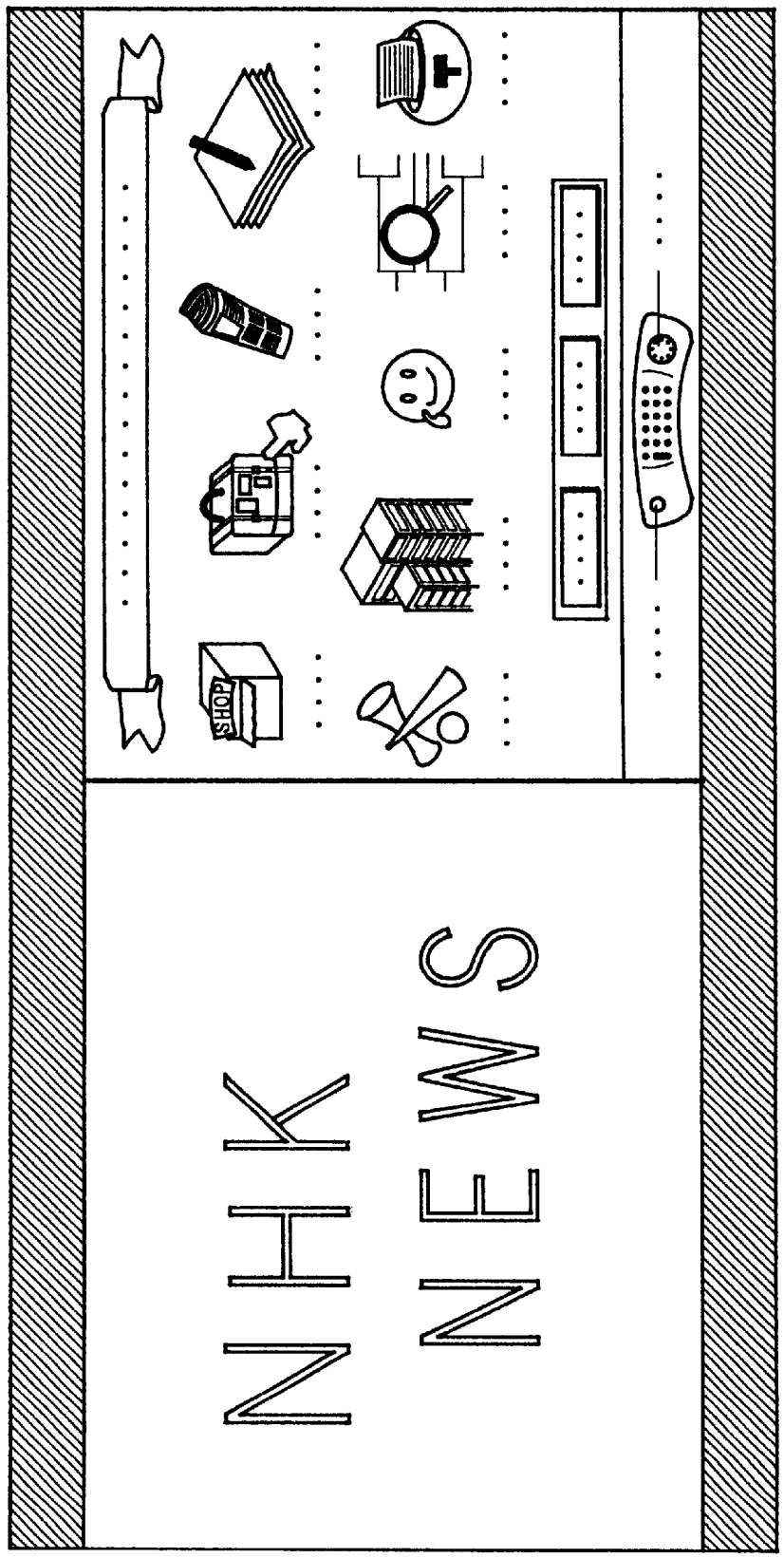
FIG. 2 is a schematic diagram showing two-screen displaying example of television program and Internet screen by an Internet information displaying apparatus.

The picture right and left composing unit 19 composes the picture signals given from the TV picture horizontal compression unit 18 and Internet processing unit 22 in the horizontal direction, and the composed picture signal is given to the RGB matrix 15, and outputted to the CRT 17 in every color. As a result, as shown in FIG. 2, the ordinary television program is shown in the left half of the display screen, and the Internet screen in the right half. This is not limited to the menu screen of the Internet, but is applicable in any screen of the Internet.

In this case, number of characters to be displayed per one line is the number of characters (for example, 72 characters) at the mode for displaying ordinaly television program and Internet screen simultaneously.

Figure 16A:
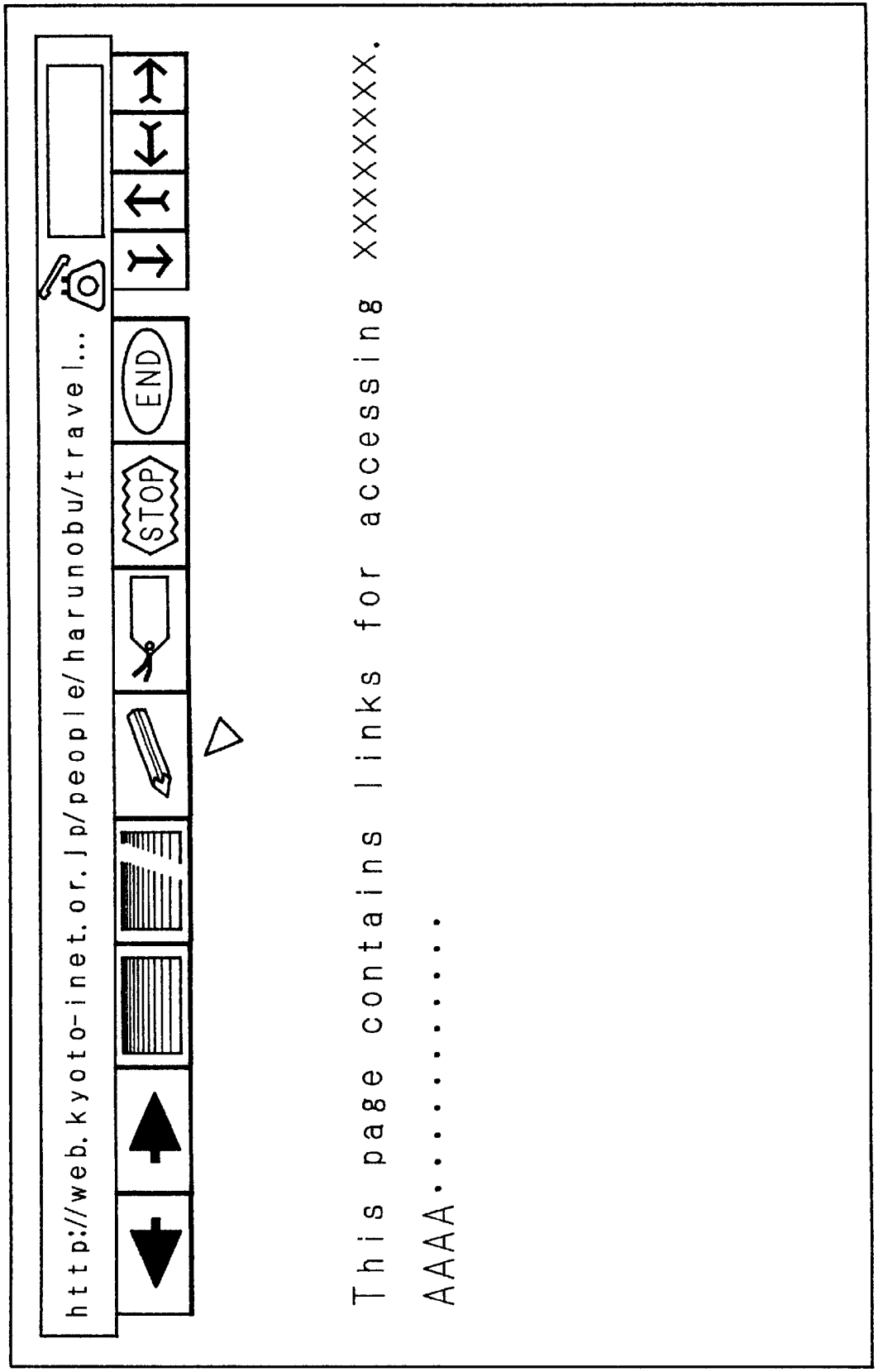
FIG. 16A is a schematic diagram showing a state of one-screen displaying of an Internet information displaying apparatus of the invention.
Figure 16B:
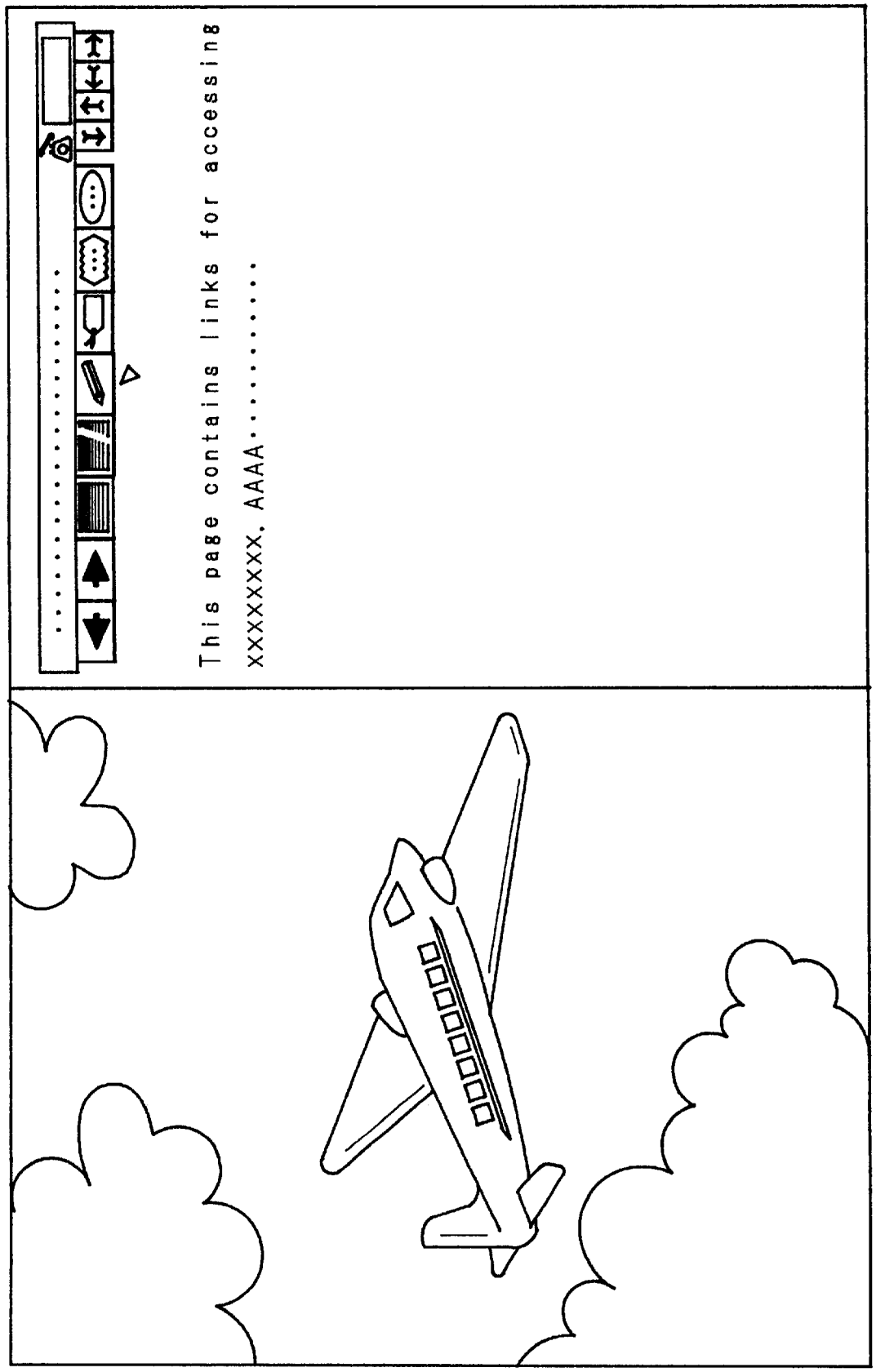
FIG. 16B is a schematic diagram showing a state of two-screen displaying of an Internet information displaying apparatus of the invention.

Concretely, when the Internet displayed on one screen as shown in FIG. 16A is displayed on two-screen together with television screen as shown in FIG. 16B, characters are displayed by automatically trimmed number of characters of one line and rearranged.

Figure 3B:
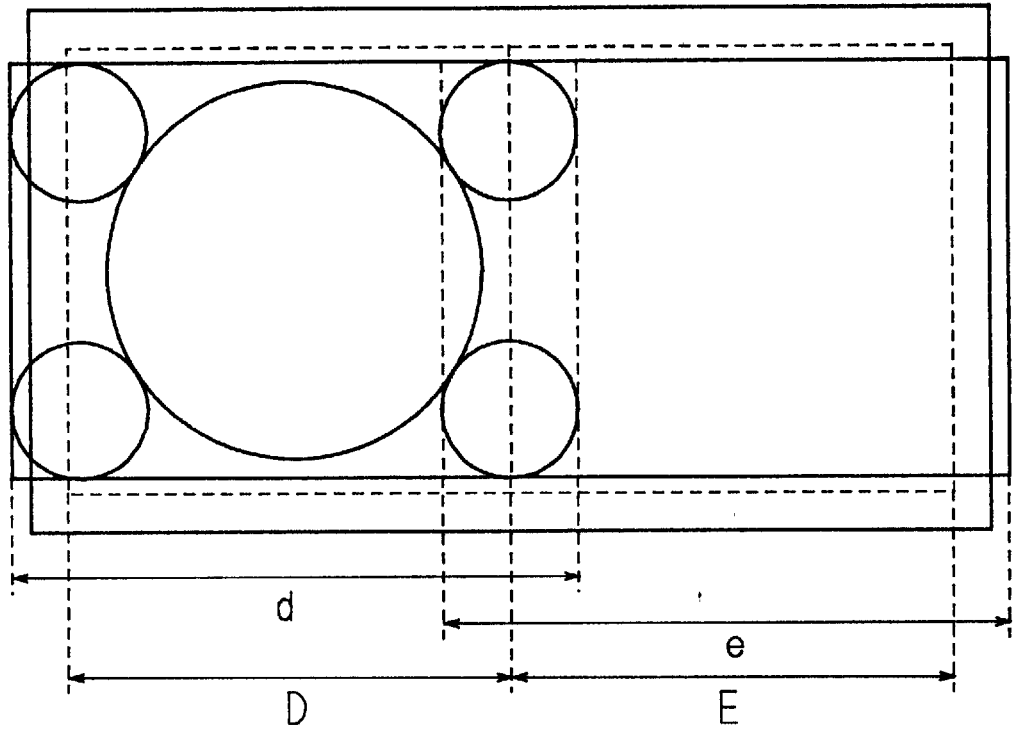
FIG. 3B is a schematic diagram showing a state in which two images each having an aspect ratio of 4:3 are displayed on a wide screen having an aspect ratio of 16:9 by two-screen displaying.

As shown in FIG. 3B, in case where the picture signal for the screen having the aspect ratio 4:3 is displayed on the respective half screen having the aspect ratio 16:9, the ratio of the area (broken line portion) displayed on the screen of side widths D, E with respect to the side widths d, e of the whole area (solid line portion) of the picture signal in the respective half screens becomes 85%. In case of displaying half and half on a wide screen having the aspect ratio of 16:9, the display images are slightly extended in the vertical direction so as to make the portions not displayed on either side less, and to prevent the images to be displayed from becoming excessively small.

When the vertical synchronizing signal and horizontal synchronizing signal are not given from the read controller 28, the interrupt controller 30 judges that the television broadcast is terminated, and notices it to the CPU 38 by interruption. By this notice, the CPU 38 actuates the clock generator 26 and synchronizing signal generator 25, and gives the vertical synchronizing signal, horizontal synchronizing signal, and clock of 8 fsc to the write controller 27 and read controller 28, so that Internet screen is continuously displayed at right half side of the display screen.

The other operations of the Internet television 1 are same as in the mode for operating as an ordinary televisions mentioned above and the mode for displaying the Internet screen in the full display screen, and the explanations are omitted.

While the Internet screen is displayed, the browser menu screen as shown in FIG. 13 is displayed at the upper end of the display screen as required. This menu screen display buttons showing the icons representing, sequentially from the left end, "Return", "Advance", "Read again", "Read image again", "URL input", "URL register, "Stop", "End", "Move down", "Move up", "Move left", and "Move right".

Figure 17:
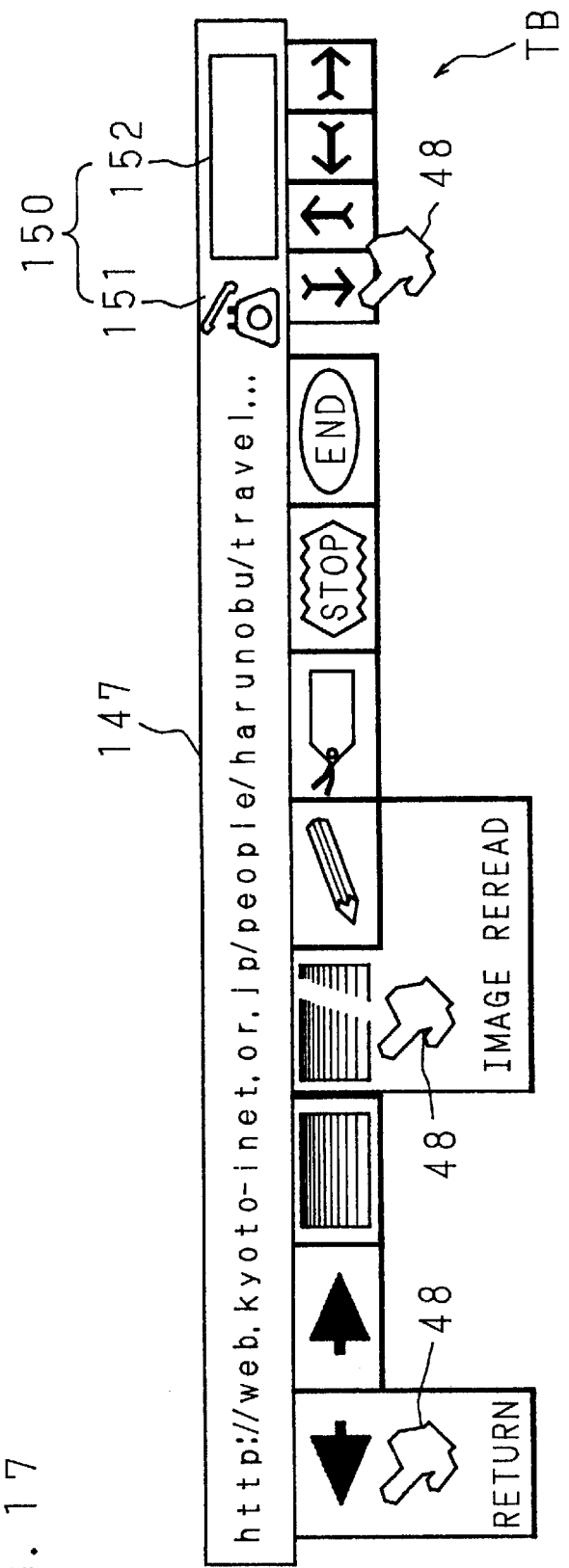
FIG. 17 is a schematic diagram showing a display example of tool bar of an Internet information displaying apparatus of the invention.

By operating the selection button 43 of the remote controller 20a and moving the pointer 46 to any of the buttons, as shown in FIG. 17, the button is extended widely in the lower direction, showing that the button is being selected. However, the buttons for "Move down", "Move up", "Move left", and "Move right" are not extended widely in the lower direction.

Once the button is selected and determined, to jump to other screen, the pointer 46 shown in FIG. 13 is changed to the "index" pointer 48 as shown in FIG. 17.

Figure 18:
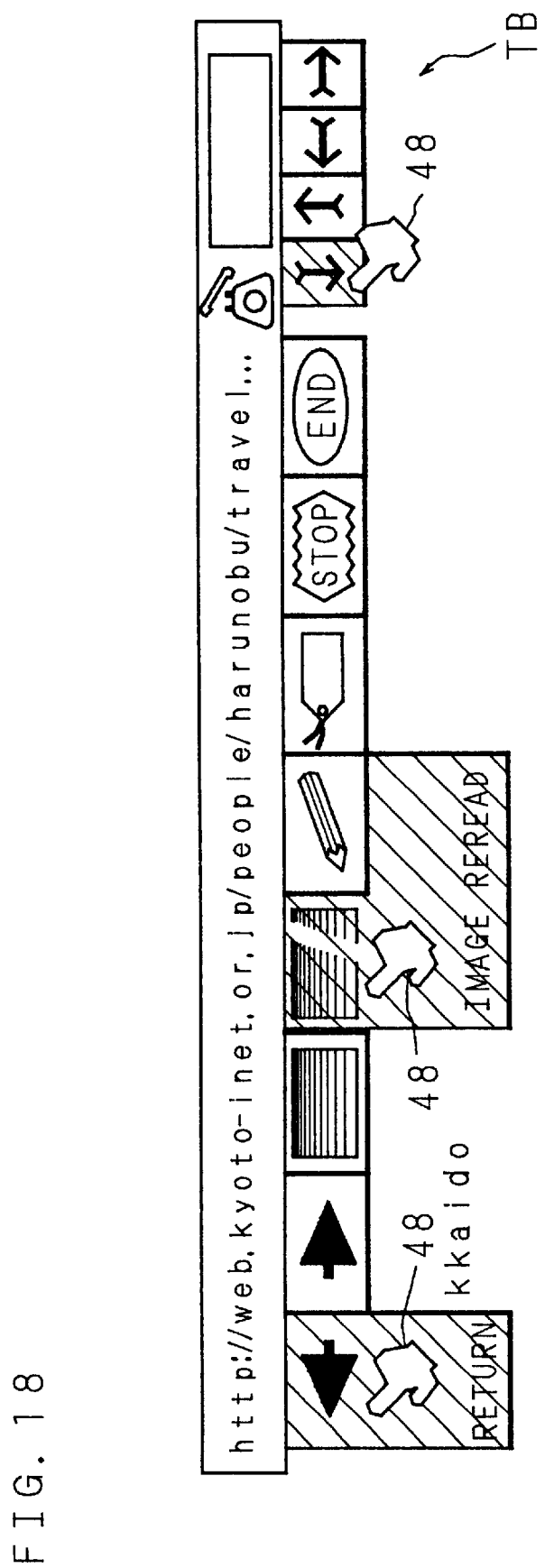
FIG. 18 is a schematic diagram showing a display example of tool bar of an Internet information displaying apparatus of the invention.

In the state of the button extended widely in the lower direction and selected, when the decision button 44 is operated (clicked), the button is once depressed as shown in FIG. 18, and the button becomes a darker color than usually, and the shadow and highlight are reversed. As a result, the selection and determination of the button are displayed.

Figure 19:
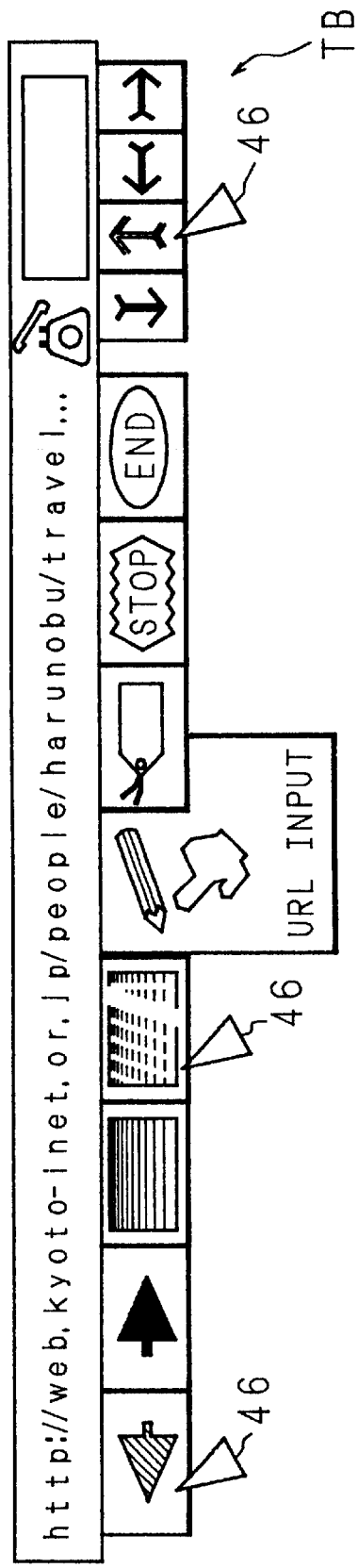
FIG. 19 is a schematic diagram showing a display example of tool bar of an Internet information displaying apparatus of the invention.

When the button is not related to any action, by moving the pointer 46 to the button, as shown in FIG. 19, the pointer 46 is not changed, and the dark and bright parts of the icon of the button are once reversed to urge caution.

Figure 20A:
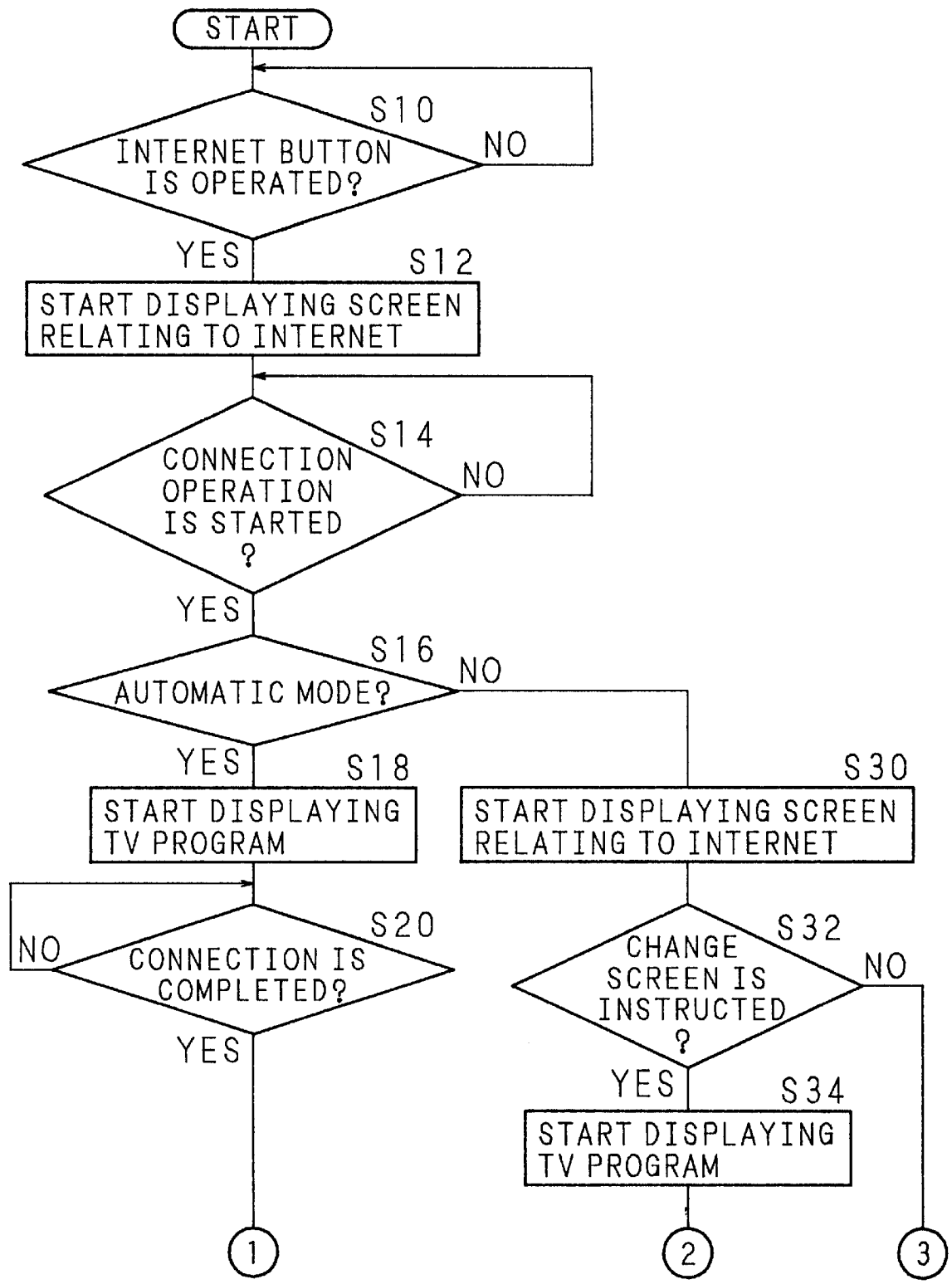
FIG. 20A is a flowchart showing an operation example of an Internet information displaying apparatus of the invention.
Figure 20B:
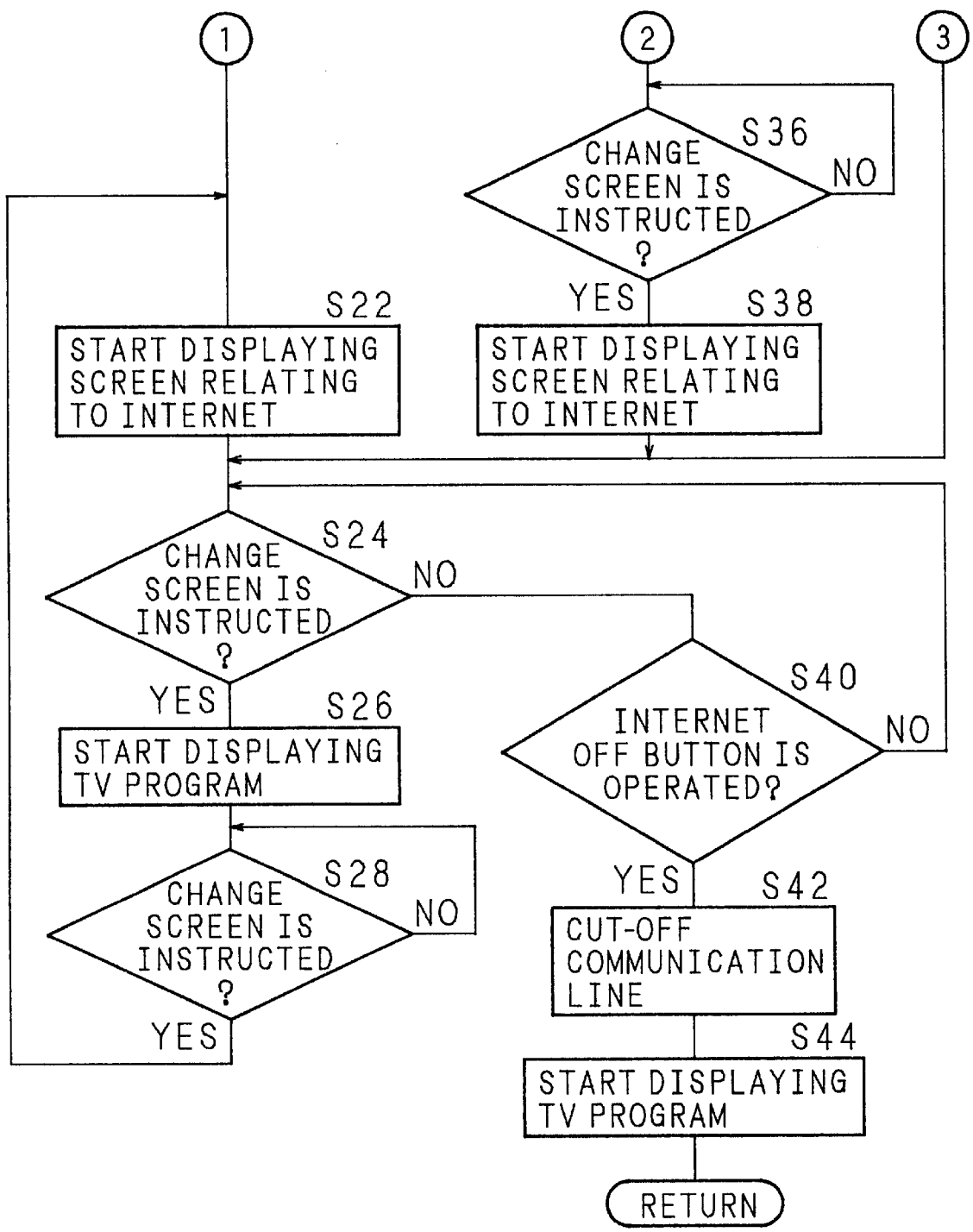
FIG. 20B is a flowchart showing an operation example of an Internet information displaying apparatus of the invention.

FIG. 20A and FIG. 20B are the flow charts showing the operates of the display screen of the CPU 38 from the time when the Internet button is operated. Hereinafter, the operation of the CPU 38 on the display screen is explained based on the flow charts.

When the Internet button of the remote controller 20a is operated (S10), the CPU 38 operates the switching unit 14 to start displaying on the screen from the Internet processing unit 22 (S12).

When the URL is decided on selection or inputted and the connecting operation of the communication line (telephone line) 24 is started (S14), if the screen switching modes during the connection operation is set to an automatic mode in the channel selection CPU 20 (S16), the CPU 38 operates the switching unit 14 to start displaying the television program on the screen (S18).

When the connection of the communication line 24 is completed (S20) and the data of the called URL home page are sent through the communication line 24 and the modem 41, the CPU 38 converts the data into an picture signal and sets it to the RAM 37. The picture signal set to the RAM 37 is displayed on the display screen in the same manner as in the initial screen (S22).

When the screen switching mode during the connection operation is set to a manual mode in the channel selection CPU 20 (S16), the CPU 38 displays "Reading out data" at the central part of the basic diagram in which a menu screen of the browser as shown in FIG. 13 is displayed at the upper end (S30). Under this state, when the remote controller 20a is operated and the screen switching is instructed (S32), the CPU 38 operates the switching unit 14 to start displaying the television program on the screen (S34).

Under this condition, when the screen switching is instructed again (S36), the CPU 38 operates the switching unit 14 to start displaying the image from the Internet processing unit 22 (S38). At this time, if the connecting operation is still under way, "Reading out data" is displayed, and if the connection is completed, the home page of the called out URL is displayed.

When, under the state of screen display from the Internet processing unit 22 (S22, S38), the remote controller 20a is operated and the screen switching is instructed (S24), the CPU 38 operates the switching unit 14 to start displaying the television program on the screen (S26). Under this condition, when the screen switching is instructed again (S28), the CPU 38 operates the switching unit 14 to start displaying the image from the Internet processing unit 22 (S22).

When, under the state of screen display from the Internet processing unit 22 (S22, S38), an Internet off button of the remote controller 20a is operated (S40), the CPU 38 cuts off the communication line 24 (S42), and operates the switching unit 14 to start displaying the television program on the screen (S44).

Figure 21:
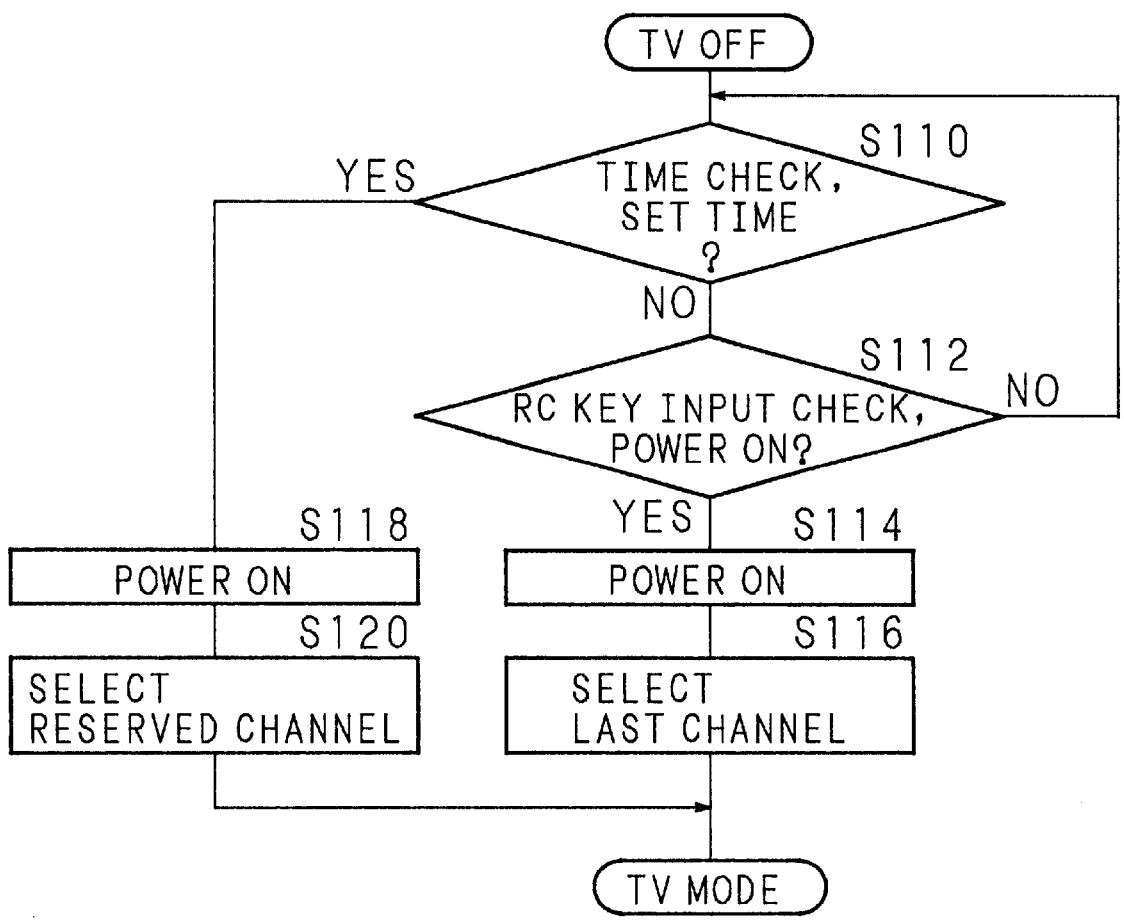
FIG. 21 is a flowchart showing an operation example of an Internet information displaying apparatus of the invention.
Figure 22:
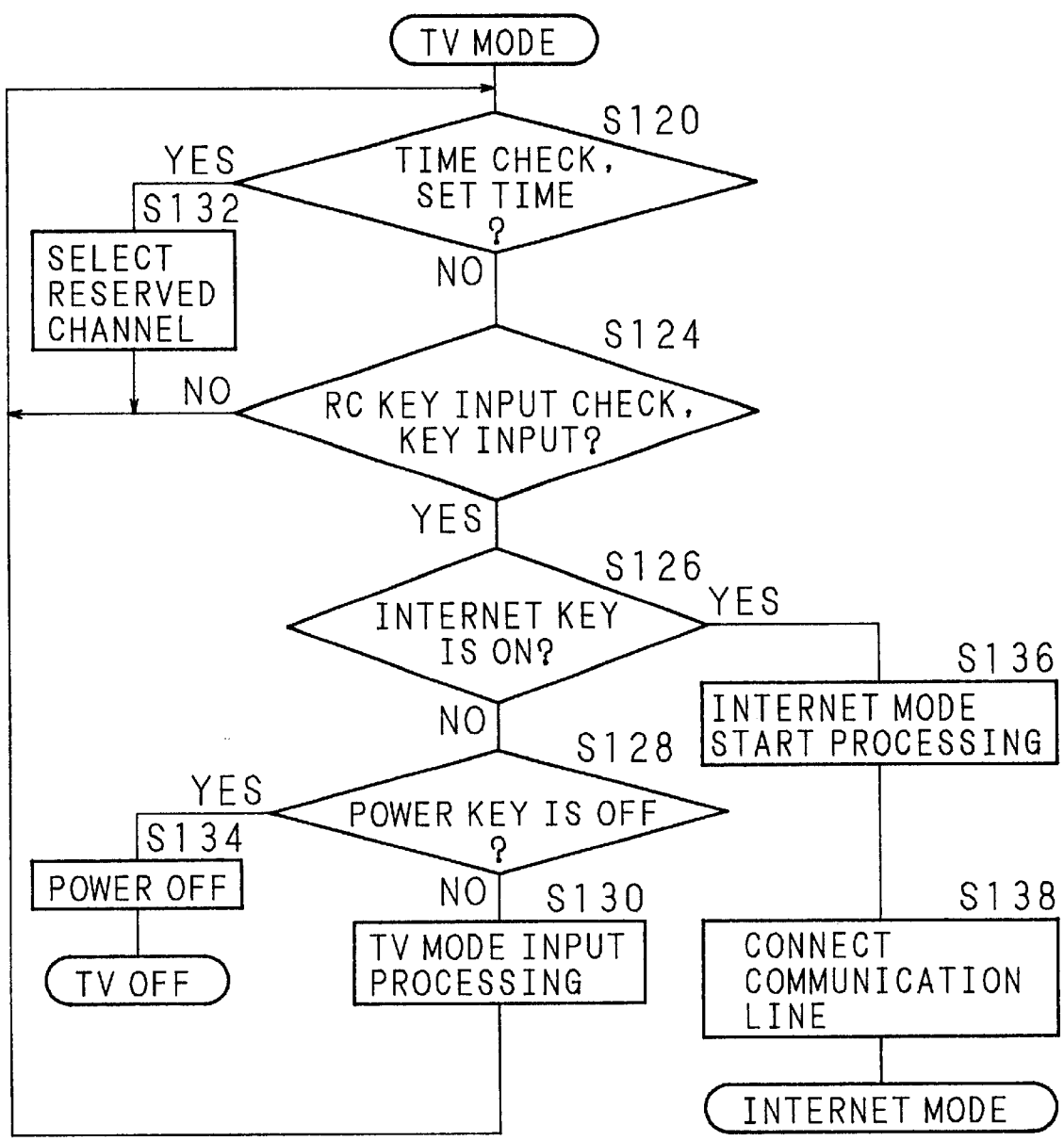
FIG. 22 is a flowchart showing an operation example of an Internet information displaying apparatus of the invention.
Figure 23:
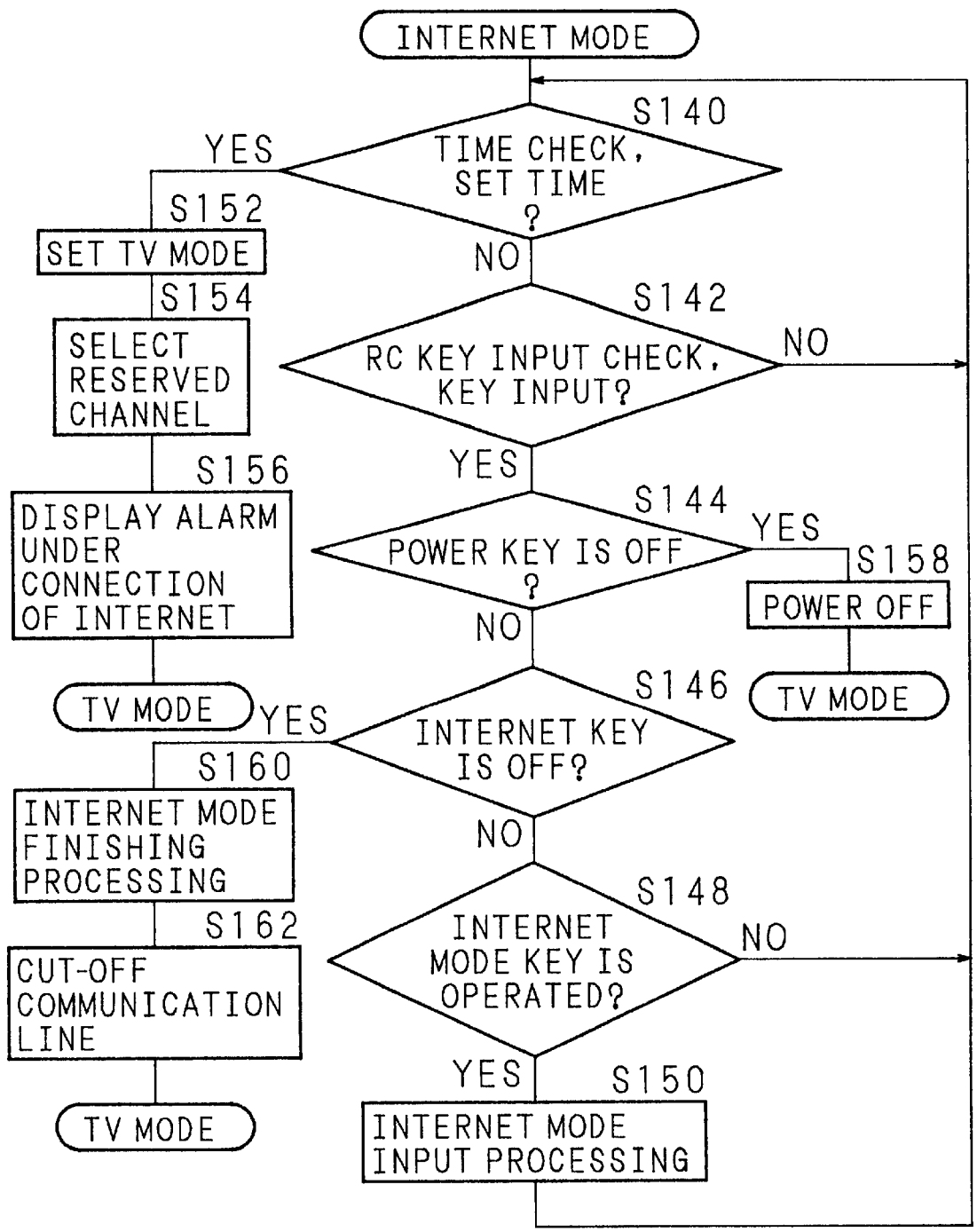
FIG. 23 is a flowchart showing an operation example of an Internet information displaying apparatus of the invention.

Next, the operation of the channel selection CPU 20 in the case of the reservation of the television program is explained in reference to the flow charts given in FIG. 21, FIG. 22 and FIG. 23.

First, explanation is given on the case of the power OFF with reference to the flow chart of FIG. 21. When the user reserves for a television program by operating the control button provided on the remote controller 20a, in case the Internet television 1 is power OFF, the CPU 50 checks the reserved time (set time) stored in the RAM 54 and the time on the timer 52, and when the time of the timer 52 is set at the reserved time (S110), the power of the Internet television 1 is turned ON (S118). Next, the reserved television channel stored in the RAM 54 is selected by the tuner 10, and the reserved television program is displayed on the screen.

When the time of the timer 52 is not set at the reserved time (S110), check is made as to whether the operating button (key) of the remote controller 20a has been operated or not, and when the operating button of the "power source" is operated (S112), the power of the Internet television 1 is turned ON (S114), and the television channel at the time of the previous power OFF of the Internet television 1 is caused to select by the tuner 10 (S116) and have the television program displayed on the screen.

When the operating button (key) of the remote controller 20a is not operated (S112), the CPU 50 checks again the reserved time (set time) stored in the RAM 54 and the time of the timer 52 (S110).

Next, explanation is given on the case of the television mode under which the Internet television 1 displays television program on the screen, in reference to FIG. 22.

The CPU 50 checks the reserved time (set time) stored in the RAM 54 and the time on the timer 52, and when the time of the timer 52 is set at the reserved time (S122), it causes to select the reserved television channel stored in the RAM 54 by the tuner 10, and to display the reserved television program on the screen (S132).

When the time of the timer 52 is not set at the reserved time (S122), the CPU 50 checks as to whether the operating button (key) of the remote controller 20a has been operated or not, and when the operating button is not operated (S124), the CPU 50 again checks the reserved time (set time) stored in the RAM 54 and the time on the timer 52 (S122).

When a button operation is made (S124), and when the button is an Internet button (key) (S126), the CPU 50 carries out processing to commence the Internet mode for displaying the screen related to the Internet (S126), and connects the telephone line (S138) to provide an Internet mode.

When a button operation is made (S124), and when the button is the "power" button (S128), the CPU 50 sets the power of the Internet television 1 OFF (S134).

When a button operation is made (S124), and when the button is not the Internet button or the "power" button, the CPU 50 carries out the processing of the television mode corresponding to the operated (S124) button (S130), and again checks the reserved time (set time) stored in the RAM 54 and the time on the timer 52 (S122).

Next, with respect to the case of the Internet mode under which the Internet television 1 displays the screen related to Internet, explanation is given with reference to the flow chart of FIG. 23.

The CPU 50 checks the reserved time (set time) stored in the RAM 54 and the time on the timer 52, and when the time of the timer 52 is set at the reserved time (S140), it switches the mode to the television mode for displaying a television program on the screen (S152). Next, the CPU 50 causes the tuner 10 to select the reserved television channel stored on the RAM 54 (S154), to display the reserved television program on the screen, and to have the OSD controlling unit 21 display the warning indicating the Internet connection being made (S156).

When the time of the timer 52 is not set at the reserved time (S140), the CPU 50 checks as to whether the operating button (key) of the remote controller 20a has been operated or not, and when the operating button is not operated (S142), the CPU 50 again checks the reserved time (set time) stored in the RAM 54 and the time on the timer 52 (S140).

When a button operation is made (S142), and when the button is a "power" button (S144), the CPU 50 sets the power of the Internet television 1 OFF (S158).

When a button operation is made (S142), and when the button is an Internet button (S146), the CPU 50 carries out processing to terminate the Internet mode (S160), to cut off the telephone line (162), and to provide a television mode.

When a button operation is made (S142), and when the button is a button associated with the Internet mode (S148), the CPU carries out processing of the Internet mode corresponding to the operated (S142) button (S150), and again checks the reserved time (set time) stored in the RAM 54 and the time on the timer 52 (S140).

When a button operation is made (S142), and when the button is not a button associated with the Internet mode (S148), the CPU again checks the reserved time (set time) stored in the RAM 54 and the time on the timer 52 (S140).

Next, explanation is given on an another embodiment of the present invention. In the constitution of the first embodiment given above, in case of carrying out the two screen display (display in two divisional parts), when the television screen shows non-interlace picture signals, no Odd/Even judgment can be made, and accordingly, only the picture signal in the field of either Odd or Even is to be outputted on each field. As a result, the Internet screen is scanned on only a half field, and the vertical resolution becomes 1/2 to show collapsed display. Especially, in the Internet screen which covers characters in addition to the images, there is an additional problem of difficulty to observe the display.

Figure 24:
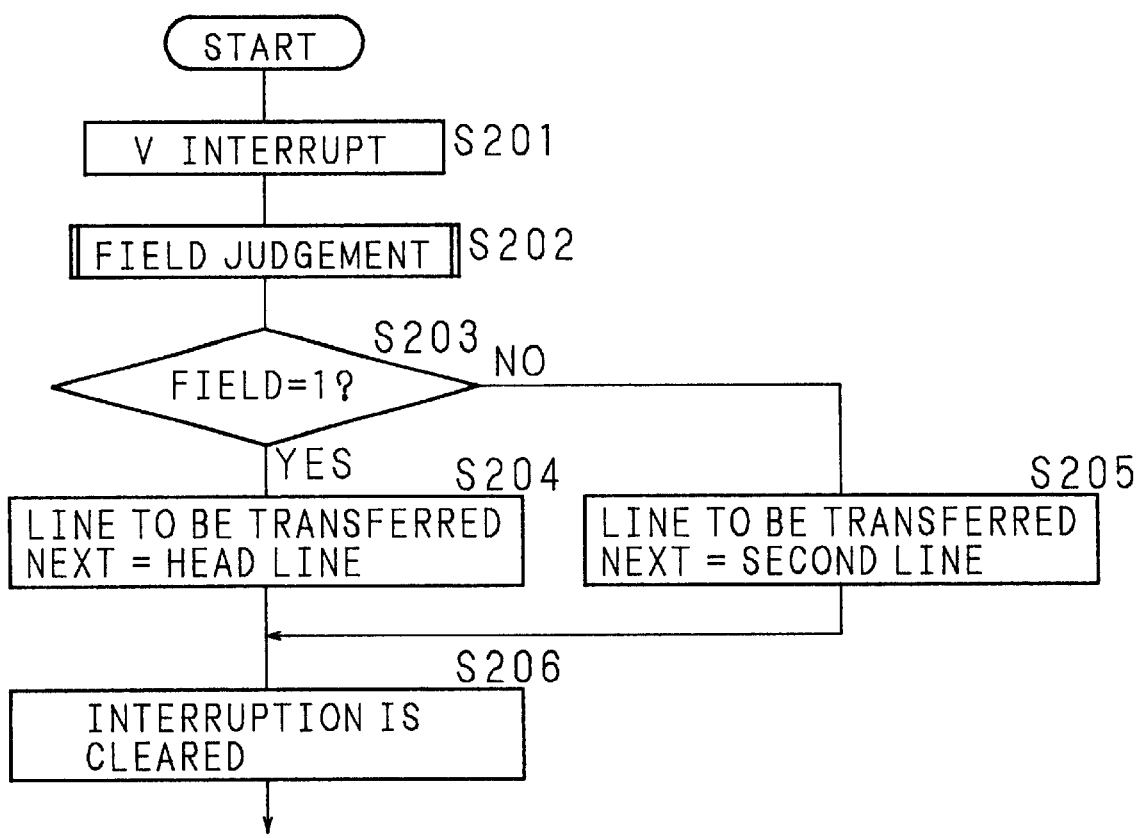
FIG. 24 is a flowchart showing an operation example of an Internet information displaying apparatus of the invention.
Figure 25:
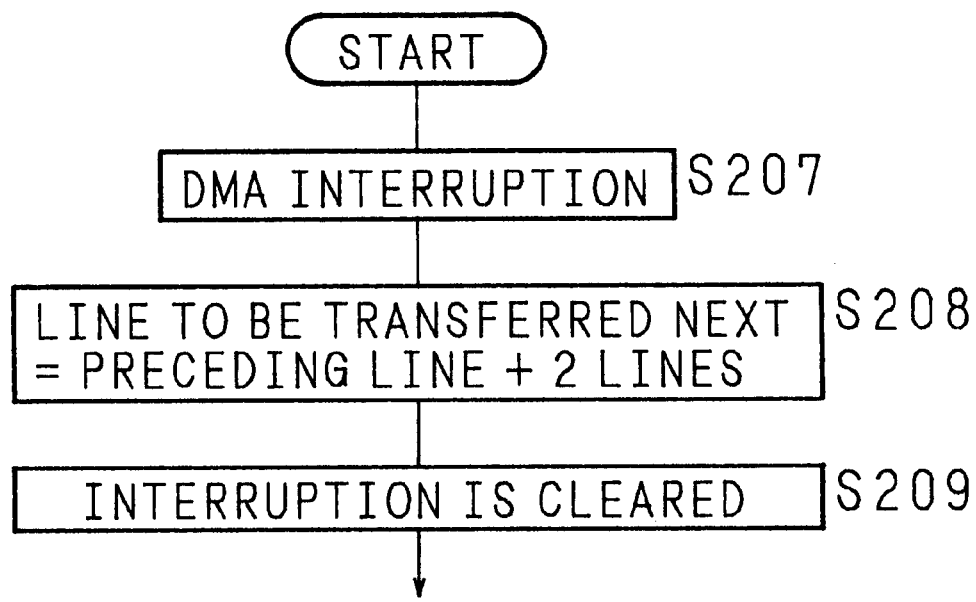
FIG. 25 is a flowchart showing an operation example of an Internet information displaying apparatus of the invention.
Figure 26:
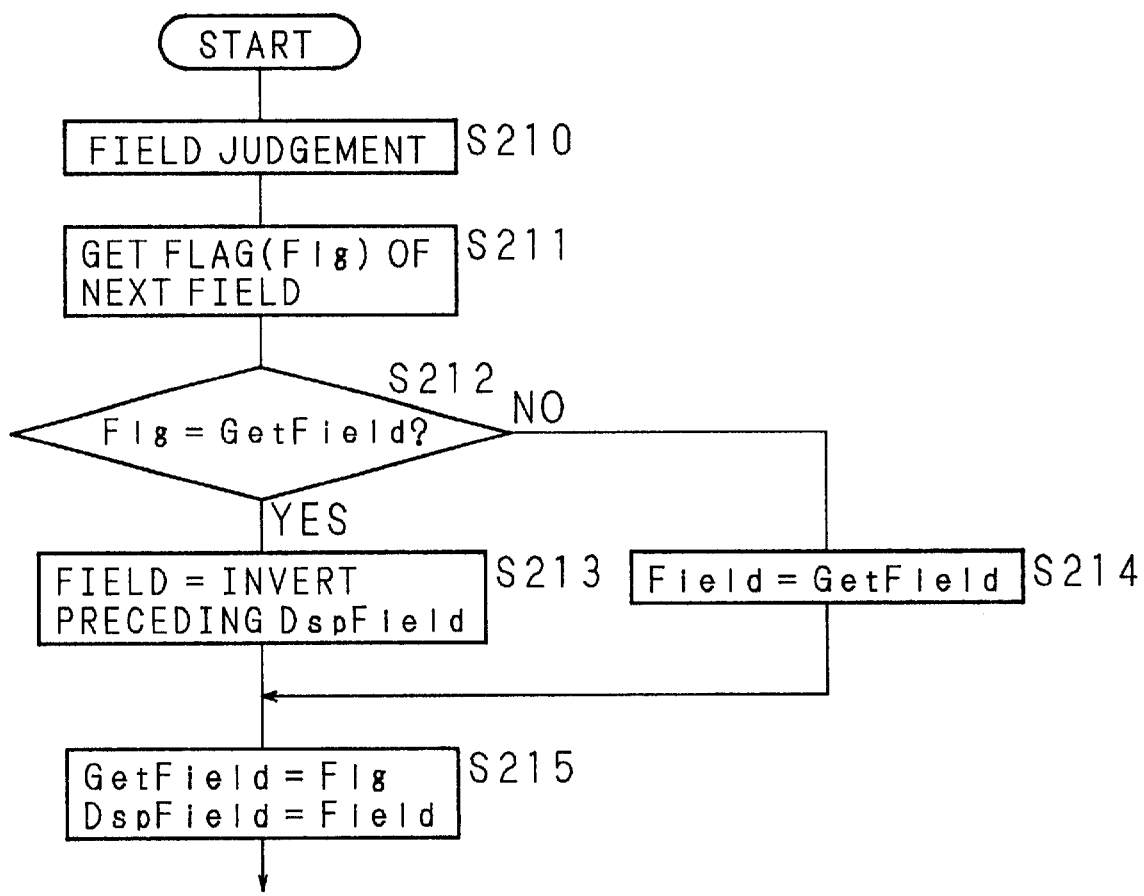
FIG. 26 is a flowchart showing an operation example of an Internet information displaying apparatus of the invention.

In view of the above, in the second embodiment, controls are made by CPU 38 as shown in the flow charts in FIG. 24, FIG. 25 and FIG. 26 and the screen display example in FIG. 27.

First, in case the Internet television displays a television screen and an Internet screen on the two divisional screens, the Internet processing unit 22 operates based on the synchronizing signal of the picture signal on the television screen. That is to say, this synchronizing signal is inputted to the gate array 36, and to the write controller 27 and the read controller 28. And, by carrying out control of the reading and writing of the picture signal data on the Internet screen to the video FIFO 29, and outputting the RGB signals from the color palette 35 in synchronization with the synchronizing signal on the television screen, it becomes possible to display the picture signal of the Internet screen on one of the screens divided into two parts.

At this time, the read controller 28 judges from the relations of the given vertical synchronizing signal and horizontal synchronizing signal whether the field to be displayed next is Odd or Even, and gives the results thereof to CPU 38 by the interrupt controller 30 at the interruption timing of the vertical synchronizing signal. In this manner, the Internet screen can be correctly displayed according to the scanning line of the picture signal on the television screen.

Here, the operation of the CPU 38 at the time of Odd or Even is explained in reference to the flow charts of FIG. 24 and FIG. 25. When the vertical synchronizing signal of the picture signal on the television screen is inputted to the read controller 28, the CPU 38 outputs it to the interrupt controller 30. The interrupt controller 30 sends the interruption timing to the CPU 38 in the vertical synchronous period.

The read controller 28 judges Odd or Even from the relations between the horizontal synchronizing signal and the to vertical synchronizing signal Odd or Even, which is given to the CPU 38 by the interrupt controller 30 (S202).

Next, if the field is Odd ("1") (S203), the CPU 38 actuates the DMA controller 38a contained in the CPU 38 to transfer the data from the line wherein the top of the scanning line of the data of the Internet screen stored in the RAM 37 to the video FIFO 29 to output the RGB signal (S204). On the other hand, if the field is Even "0" (S203), the data from the line wherein the top of the scanning lines of the data of the Internet screen stored in the RAM 37 is Even (second line) is transferred to the video FIFO 29 to output the RGB signal (S204). By the above operation, the timing of the start of scanning is set, and thereafter the interruption of the vertical synchronous period is to be cleared (S206).

Also, the reading out of the data on each scanning line is made as shown in FIG. 25. That is to say, when the start of the scanning line is determined as described above, the read controller 28 transfers the CPU 38 information so as to make DMA interruption to the interruption controller 30 based on the horizontal synchronizing signal (S207). Then, the CPU 38 actuates the DMA controller 38a to transfer the data corresponding to the line which includes two additional lines to the line corresponding to the top line from the RAM 37 to the video FIFO 29 and outputs the RGB signal from the color palette 35 (S208). When the horizontal synchronizing signal period is terminated, the interruption is cleared (S209).

When the next horizontal synchronizing signal is inputted, the operations as described above are repeated, in which case, in the line to be transferred next, the data corresponding to the lines which include two additional lines to the above-described lines are transferred.

Figure 27A:
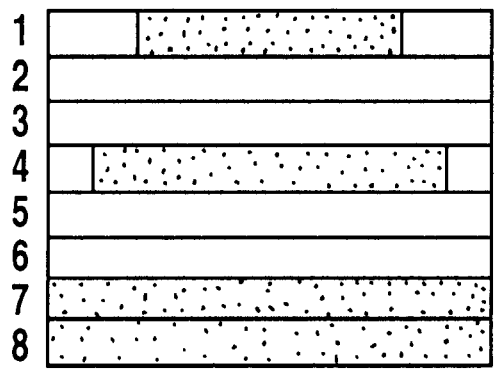
FIG. 27A is a schematic diagram showing a display example of an Internet information displaying apparatus of the invention.

To show the above operation by the display examples, as shown in FIG. 27A (in this figure, the whole screen is indicated as 8 lines for simplifying the illustration), in case the field is Odd, the DMA controller 38a transfers the data in order from the foremost 1 line, followed by 3 lines, 5 lines, 7 lines, and so on, and when the field is Even, it transfers the data sequentially in order of foremost 2 lines, followed by 4 lines, 6 lines, 8 lines, and on.

Figure 27B:
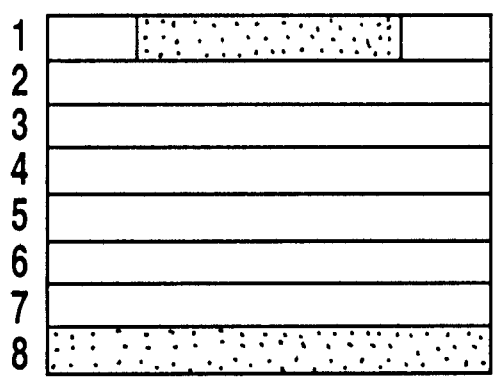
FIG. 27B is a schematic diagram showing a display example of an Internet information displaying apparatus of the invention.

The interlace television screen is operated in the above manner. However, in the case of the non-interlace, because no field can be judged, the data reading out is made only on one side field. For example, as shown in FIG. 27B, only the data consisting solely of Odd is to be read out, where the vertical resolution is lowered to 1/2.

Accordingly, the field judgement step (S202) in FIG. 24 is set to a state as shown in FIG. 26. That is to say, the field is judged from the relations between the vertical synchronizing signal and the horizontal synchronizing signal (S210). And, based on the field judgement results, the flag (Flg) is set to "1" in case of Odd, and to "0" in case of Even (S211). Next, judgment is made as to whether or not the flag (Flg) obtained as a result of the field judgement is the same as the GetField which is stored as a result of the field judgement obtained in the previous field (S211), and if it is the same as that of the previous field, it is judged as non-interlace and made into an opposite field to the DspField which is the field actually displayed in the previous field (S213).

On the contrary, if the result is not the same as that of the previous field, then the signal is judged to be an interlace, and, using the GetField which is stored as a result of the field judgment obtained in the previous field with the flag (Flg) obtained as a result of the judgement as the GetField, the field to be actually displayed (DisField) is set to be the obtained field (S214). And, the GetField and DspField are to be stored respectively (S215).

In this manner, the DMA controller 38a is so controlled as, in the judgment of the field in the interruption in the vertical synchronous period, to read out the data of the RAM 37 of the different field compulsorily and display them, if the result is the same as that of the previous field.

Figure 27C:
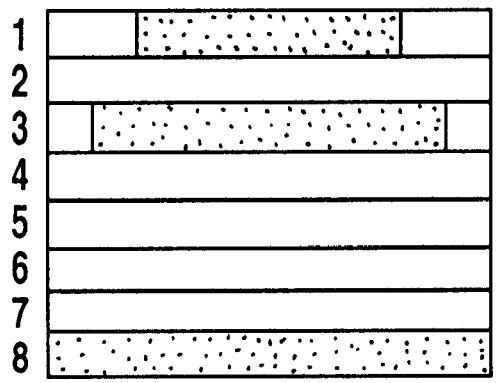
FIG. 27C is a schematic diagram showing a display example of an Internet information displaying apparatus of the invention.

Accordingly, with respect to the display example of the non-interlace screen, when judgement is kept on that the field is Odd as in FIG. 27C, on the Odd field of the first field display there are displayed the line 1, line 3, line 5, and line 7 of the data of RAM 37, and as to the display of the second field, there are displayed on the display positions of the same Odd field, the line 2, line 4, line 6, and line 8 of the data of RAM 37 in the same display positions of the same Odd field. By so arranging, the data of line 4 are to be displayed on the third line, and there is no lack of the image data in the vertical direction in comparison with the prior art, and less obscure expression of images.

Next, the third embodiment of the present invention is explained. According to the first embodiment described above, there can be a method of use such as to enjoy television program by turning on the television screen with the Internet screen display turned off during the time of downloading the Internet text or image data.

In the above case, while the Internet screen display is off, the Internet circuit is in operating condition due to the downloading. Therefore, as the Internet circuit is operating notwithstanding the non-display of the Internet screen, the DMA function for actuating the display function remains working.

Accordingly, as the circuit is to occupy the bus which is operating with DMA function, the time for the CPU to use the bus becomes less, and there is a defect that the data downloading is slowed. Also, due to the working of the DMA function, the electric current for reading out the RAM data is consumed. Especially, the current consumption for RAM access is large. Furthermore, there occurs interference with the television screen data reading out of RAM and due to the unnecessary radiation by the picture signal outputted from the Internet circuit. Especially, the effect is large in case of the television broadcast in weak electric field.

Figure 28:
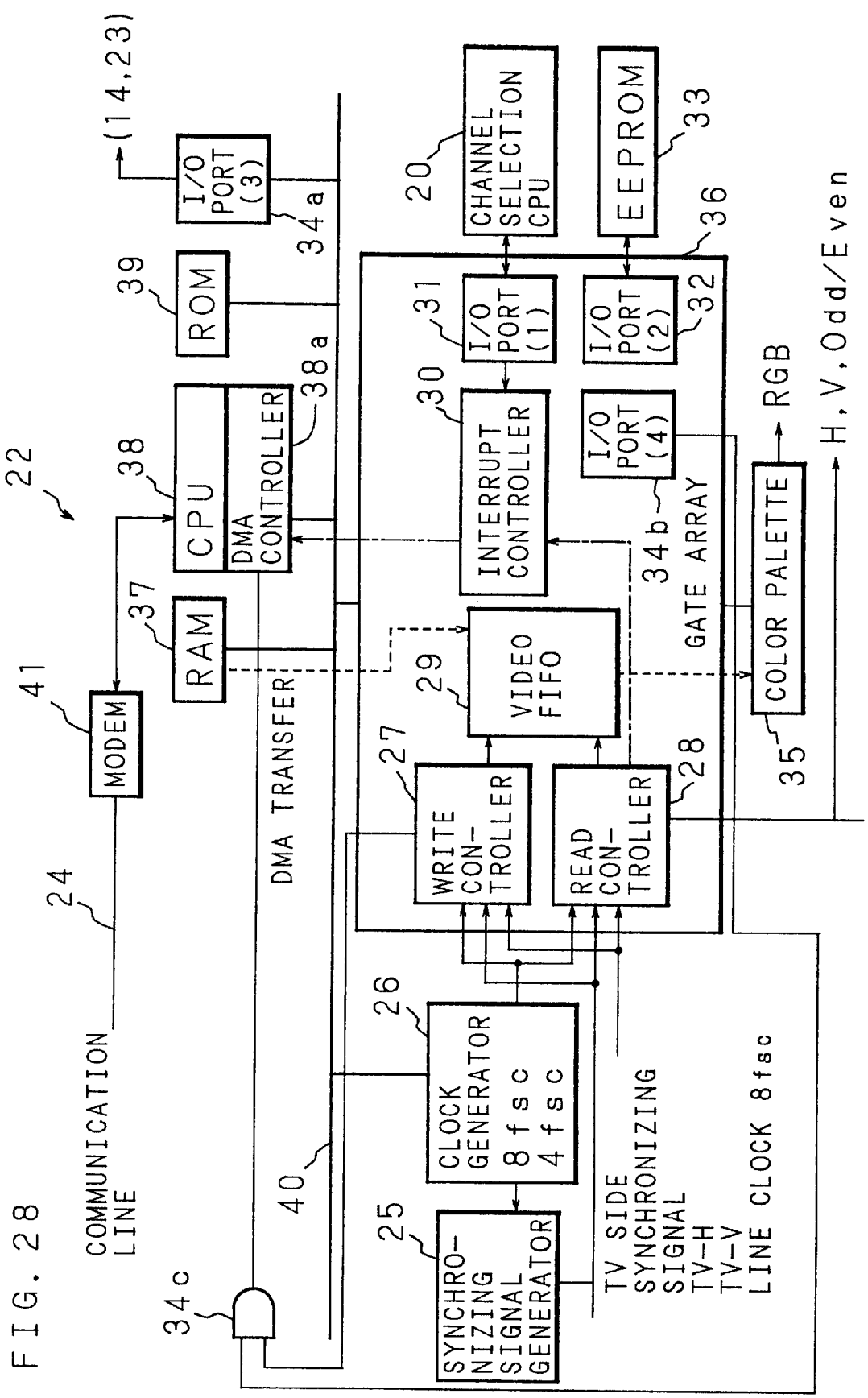
FIG. 28 is a block diagram showing a constitution of Internet processing unit of an Internet information displaying apparatus of an another embodiment of the invention.

Accordingly, in the third embodiment, the Internet processing unit 22 is made to a constitution as shown in the block diagram of FIG. 28. In this FIG. 28, because the reference symbol which is the same as that of FIG. 6 in the first embodiment has the same function, its description is omitted.

In the block diagram of the third embodiment shown in FIG. 28, the elements added to the block diagram of the first embodiment shown in FIG. 6 are the I/O port (4) 34*b* and the AND circuit 34*c*, and their operations are explained below.

In the first place, as described in the part of the prior art, the video FIFO 29 which is inside the gate array 36 carries out image drawing to the video FIFO 29 and display output on the basis of the horizontal synchronizing signal, vertical synchronizing signal, and Odd/Even judgement result. The timing for the image drawing is that, as stated with respect to the prior art, as shown in FIG. 10, the DMA controller 38*a* in the CPU 38 causes to read out the color signals R, G, and B of the picture signal from the RAM 37 by DMA from one line before the start of display on the CRT 17 (right upper part in FIG. 10), and it completes writing in the video FIFO 29 during the period of the ineffective display region B not displayed on the display screen of the CRT 17 (horizontal retrace line period), and during the period of the effective display region A displayed on the display screen of CRT 17, the read controller 28 carries out reading from the video FIFO 29.

The read controller 28 gives the judgement result 1 as to whether the field to be displayed next is Odd or Even, to the DMA controller 38*a* of the CPU 38 by the interrupt controller 30 at the interruption timing of the vertical synchronizing signal. The DMA controller 38*a* sets the address in the RAM 37 of the picture signal to be read out according to the result thereof.

Therefore, according to the present embodiment, in case the display of the Internet screen is OFF, it is designed to receive information from the channel selection CPU 20. The DMA controller 38*a* first carries out transfer of DMA for 1 line portion, and writes the same amount of data for all 640 pixels, e.g., black (data 0).

And, after writing in the black data, an Internet OFF signal is prepared inside the gate array 36, and a mask signal in which the I/O port (4) 34*b* becomes "LOW" while the Internet is OFF is outputted. From the write controller 27, the DMA request signal for operating the DMA is outputted, and inputted to the DMA controller 38*a* of CPU 38.

By inputting the DMA request signal and the mask signal to the AND circuit 34*c*, the DMA request signal is no longer inputted to the DMA controller 38*a*, and DMA controller 38*a* stops to operate.

By the above, the data of the video FIFO 29 all remains 0, and becomes constant in the black output. Also, no writing of data in the data of the video FIFO 29 is made until the display of Internet display screen is ON, because the DMA controller 38*a* is in stopped state.

In the block diagram of the third embodiment shown in FIG. 28, a signal to stop the DMA controller 38*a* is made in the AND circuit 34*c*. However, the software may be realized so that the DMA controller 38*a* disregards the DMA request signal by directly inputting the mask signal and the DMA request signal to the CPU 38.

Figure 29:
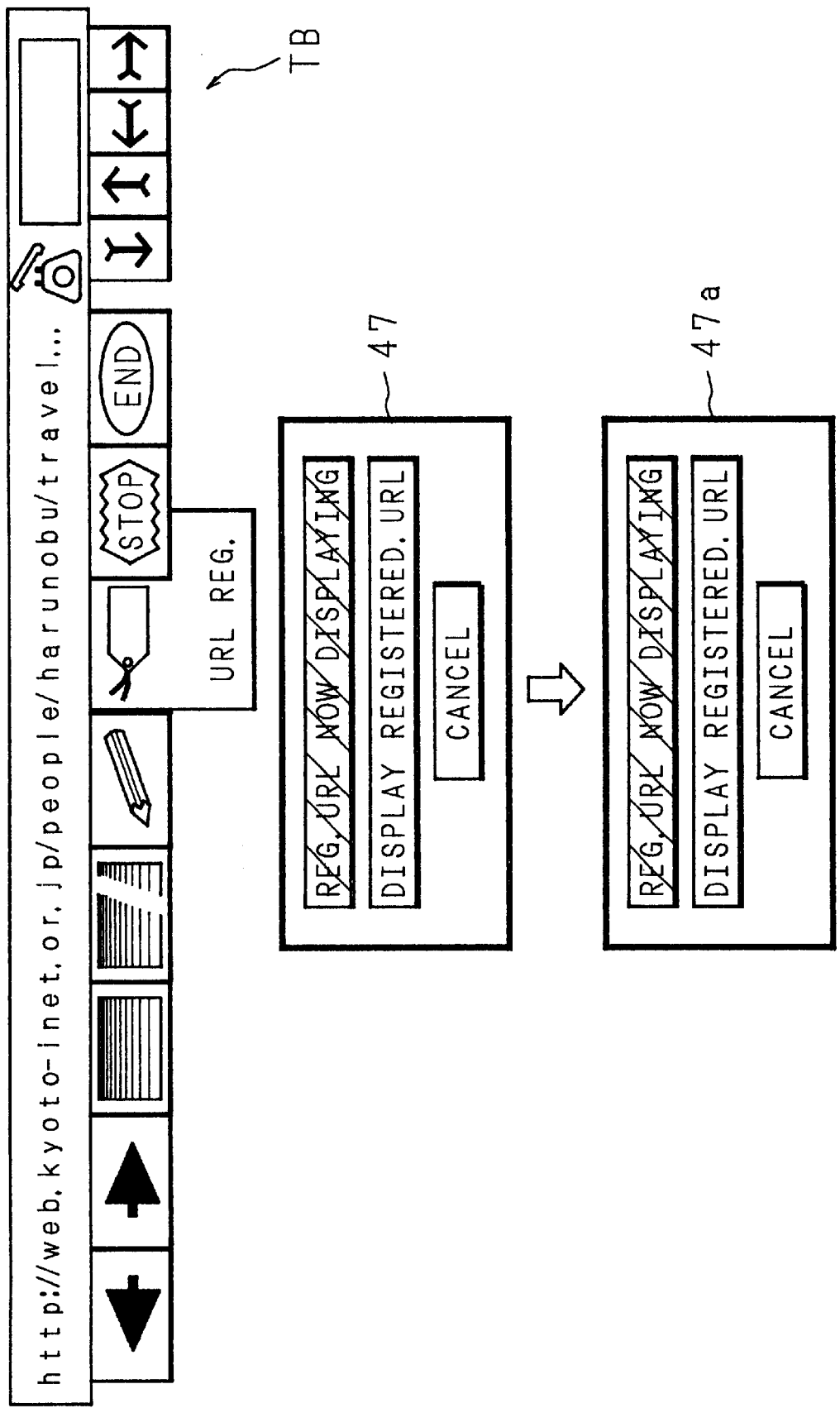
FIG. 29 is a schematic diagram showing a display example of tool bar of an Internet information displaying apparatus of the invention.

FIG. 29 is other explanatory diagram of the browser menu screen. In this menu screen, when the button is selected and determined, a large button relating to that button is displayed together with the panel 47. At this time, the key cursor moves only on the large button by the operation of the selection button 43, and when the key cursor moves onto the button, the button becomes bright to display that the button is selected (panel 47). In this state, when the decision button 44 is operated, the button is once depressed, showing that the button is selected and determined (panel 47*a*).

Figure 30:
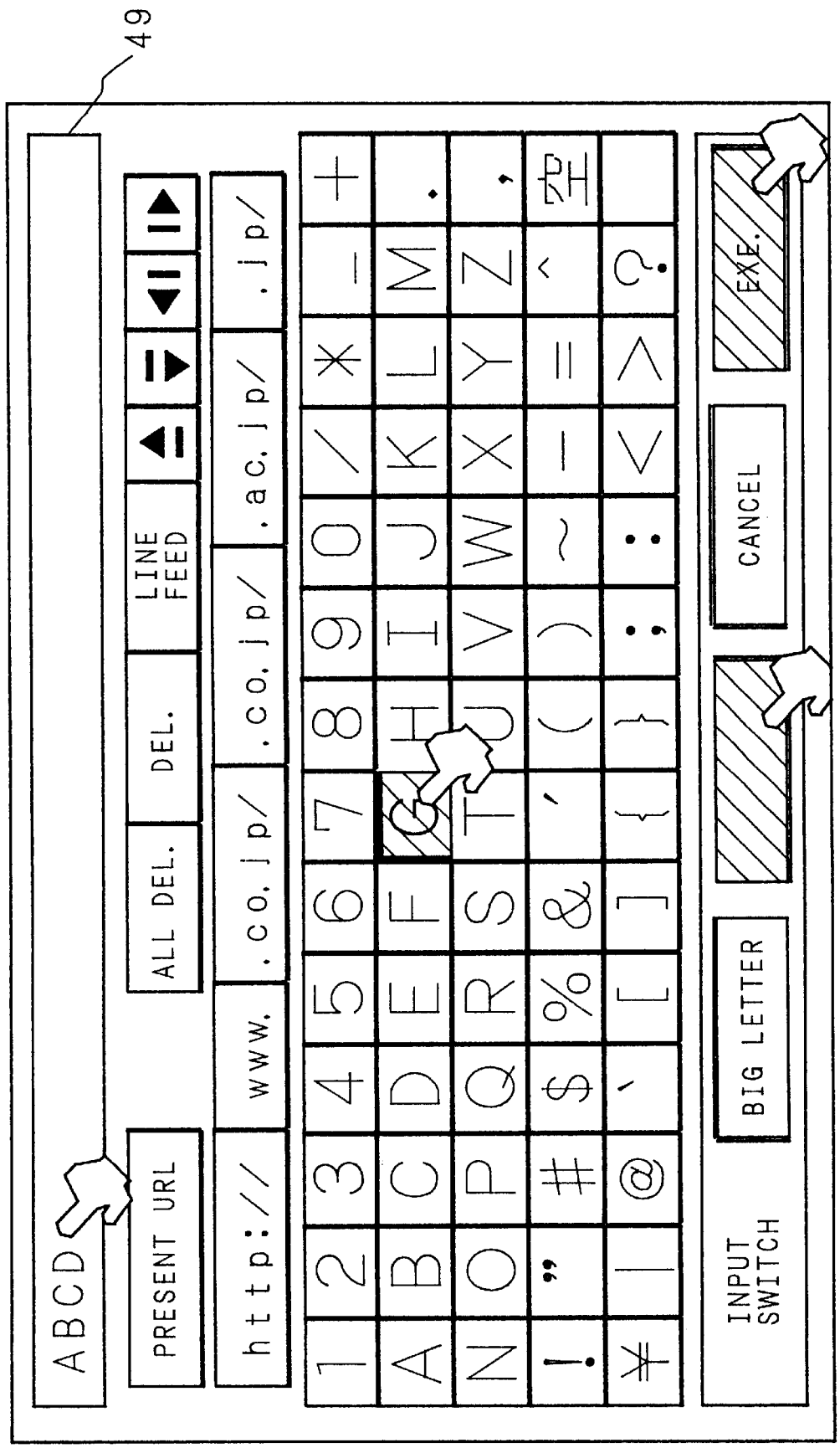
FIG. 30 is an explanatory diagram of a character palette.
Figure 31:
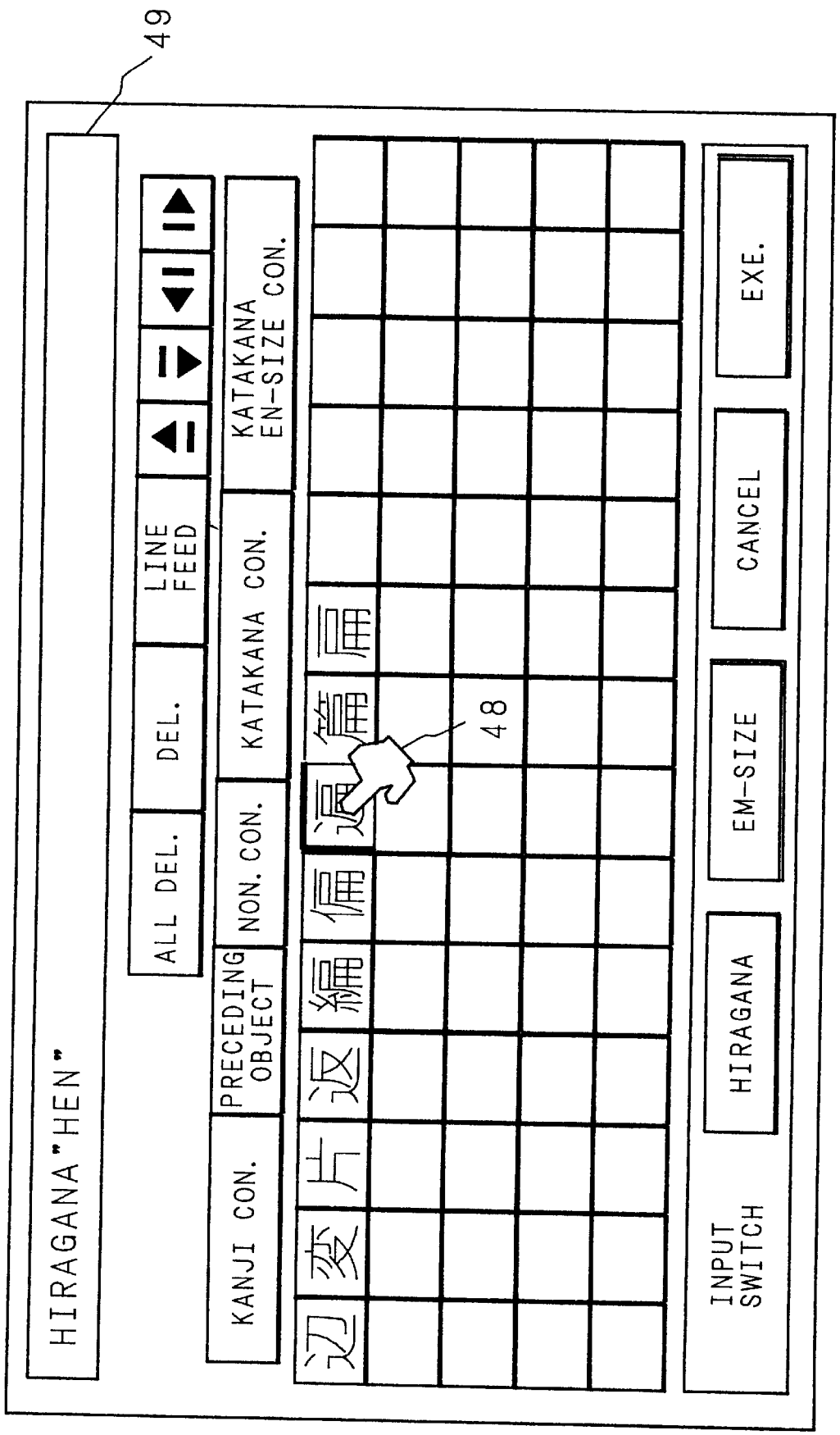
FIG. 31 is an explanatory diagram of a character palette.

FIG. 30 and FIG. 31 are explanatory diagrams of character palette. The character palette is displayed by selecting and determining the character input button when character input is necessary in the case of URL input and making an E-mail. In the character palette, buttons are assigned for every character, symbol and operation item. FIG. 30 shows a character palette of alphanumerics and capitals, and FIG. 31 shows a character palette of transfer of Chinese characters, and moreover character palettes for alphanumerics and lower cases, hiragana, and others are displayed by selecting and determining the operation item button as required.

The pointer is preliminarily moved to the position where character input is necessary, the decision button 44 is operated, and the cursor display is changed within the screen frame where character input is necessary. In this state, when the character input button is selected and determined, the character palette is displayed, and the index pointer is moved onto the button by the operation of the selection button 43, and the decision button 44 is operated, and then the button is once depressed and the color becomes dark for a moment, showing that the button is selected and determined. The character corresponding to the button selected and determined is displayed in the input display column 49, and the character input is entered into the required screen frame.

In the foregoing embodiments, the Internet information displaying apparatus of the invention is applied to the television receiver, but this is not limitative. For example, contrary to the embodiments, it is also possible to realize by incorporating a function of television receiver in an ordinary personal computer capable of communicating through the Internet.

As this invention may be embodied in several forms without departing from the spirit of essential characteristics thereof, the present embodiments is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An internet information displaying apparatus, comprising:

picture signal outputting means for extracting a first picture signal from a video signal and outputting it;

data converting means for converting digital data including character information taken in from the Internet through a communication line into a second picture signal;

a displaying apparatus for displaying a picture signal on a screen;

first horizontal direction compressing means for compressing said first picture signal in said horizontal direction of the screen of said displaying apparatus;

second horizontal direction compressing means for compressing said second picture signed in the horizontal direction of the screen of said displaying apparatus;

picture composing means for composing the picture signals compressed by said first horizontal direction compressing means and said second horizontal direction compressing means, respectively, in a row;

switching means for switching the picture signal to be displayed on the screen of said displaying apparatus into any of said first picture signal, said second picture signal, and said picture signal composed by said picture signal composing means;

storing means for storing said digital data as the second picture signal taken in from the Internet corresponding to the picture signal of at least one frame;

second horizontal direction compressing means compressing said digital data as the second picture signal stored in said storing means in the horizontal direction of the screen of said displaying apparatus;

displaying means for displaying the picture signal from said picture composing means on the screen of said displaying apparatus;

judging means for judging whether the first picture signal extracted from said video signal is non-interlace or interlace; and controlling means for controlling in a manner to output the digital data stored in said storing means to said second horizontal direction compressing means by adjusting with the field of said first picture signal when judged to be interlace by said judging means, and to output the digital data stored in said storing means to said second horizontal direction compressing means on each field when judged to be non-interlace by said judging means, wherein said judging means judges by comparison as to whether the present field and the preceding field of the picture signals are the same fields of odd number or even number or the different fields, and wherein said controlling means, when said judging means judges to be non-interlace, controls to output the digital data of the different field on the field of said second picture signal respectively to said second horizontal direction compressing means from the digital data stored in said storing means.

2. The Internet information displaying apparatus as set forth in claim 1, wherein said first horizontal direction compressing means and said second horizontal direction compressing means both have line memories which store the picture signals in the unit of the scanning line, in said first horizontal direction compressing means, said first picture signal is written in by the write clock of the multiple frequency of the horizontal synchronizing signal extracted from said second picture signal, and the first picture signal is read out by the read clock of the double frequency of said write clock, in said second horizontal direction compressing means, said second picture signal is written in by carrying out DMA (Direct Memory Access) with the timing based on the horizontal synchronizing signal and vertical synchronizing signal extracted from said second picture signal, and in said storing means, said second picture signal is read out by carrying out DMA (Direct Memory Access) with the timing based on the horizontal synchronizing signal and vertical synchronizing signal extracted from said second picture signal.

* * * * *